United States Patent [19]
Jones

[11] Patent Number: 5,752,164
[45] Date of Patent: *May 12, 1998

[54] AUTONOMOUS REMOTE MEASUREMENT UNIT FOR A PERSONAL COMMUNICATIONS SERVICE SYSTEM

[75] Inventor: J. Barclay Jones, Washington, D.C.

[73] Assignee: American PCS L.P., Bethesda, Md.

[*] Notice: The term of this patent shall not extend beyond the expiration date of Pat. No. 5,410,737.

[21] Appl. No.: 428,730

[22] Filed: Apr. 25, 1995

Related U.S. Application Data

[63] Continuation-in-part of Ser. No. 874,370, Apr. 27, 1992, Pat. No. 5,410,737.

[51] Int. Cl.$^6$ .................................................. H04Q 7/34
[52] U.S. Cl. .................. 455/33.1; 455/56.1; 455/62; 455/67.1; 455/226.1; 379/29; 379/58
[58] Field of Search .................. 455/67.1, 67.3, 455/67.5, 67.4, 62, 63, 226.1, 226.2, 53.1, 56.1, 33.1, 33.2, 33.3, 33.4, 34.1, 34.2; 379/21, 27, 29, 32, 1, 58, 59, 63

[56] References Cited

U.S. PATENT DOCUMENTS

| | | | |
|---|---|---|---|
| 3,764,915 | 10/1973 | Cox et al. | 455/33.1 |
| 4,672,657 | 6/1987 | Dershowitz | 379/63 |
| 4,736,453 | 4/1988 | Schloemer | 455/33.2 |
| 4,768,220 | 8/1988 | Yoshihara et al. | 379/63 |
| 4,783,780 | 11/1988 | Alexis | 370/280 |
| 4,792,984 | 12/1988 | Matsuo | 455/32.1 |
| 4,829,554 | 5/1989 | Barnes et al. | 379/63 X |
| 4,868,885 | 9/1989 | Perry | 455/226.2 X |
| 4,870,696 | 9/1989 | Yorita | 455/49.1 |

(List continued on next page.)

FOREIGN PATENT DOCUMENTS 2051866 4/1992 Canada.

OTHER PUBLICATIONS

EIA/TIA TSB10-E; Interference Criteria for Microwave Systems in the Private Radio Services; p. 32, Nov. 1990.

(List continued on next page.)

*Primary Examiner*—Reinhard J. Eisenzopf
*Assistant Examiner*—Philip J. Sobutka
*Attorney, Agent, or Firm*—Dorsey & Whitney LLP

[57] ABSTRACT

A Personal Communications Service (PCS) System is described. The frequency control system (30) allows PCS systems to coexist in the same frequency band as Private Operational Fixed Microwave Service (POFS) systems without mutual interference. This system (30) also controls frequency usage within a PCS system to eliminate interference from within the PCS system. This interference elimination system combines theoretical radio frequency interference analysis with measurements of actual frequency usage and allows for efficient and coordinated dynamic frequency allocation planning and management. To control frequency assignment and eliminate interference, the system (30) employs several mechanisms including an intersystem interference analysis, an intrasystem interference analysis, a channel use verification (CUV) procedure, and a measured data analysis (MDA). These mechanisms are performed by a centralized controller, channel utilization controller (CUC) (50), comprised of interference analysis/frequency planning computer programs with supporting data bases and data communication links. The FAST system makes use of an autonomous measured signal gathering system. Each base station, or other fixed site, and a Test Mobile Unit is equipped with a Remote Measurement Unit (RMU). The RMU is comprised of a microcontroller, spectrum analyzer and modem (if located at the base station). Under the automatic direction and control of the microcontroller and CUC, the spectrum analyzer is directed to take signal power measurements across a frequency band of interest. The RMU processes, packages and stores the measurements into data files for transfer to the CUC. The CUC uses these measurements as part of the CUV and MDA mechanisms.

10 Claims, 12 Drawing Sheets

U.S. PATENT DOCUMENTS

| | | | |
|---|---|---|---|
| 4,878,238 | 10/1989 | Rash et al. | 375/368 |
| 4,881,271 | 11/1989 | Yamauchi et al. | 455/56.1 |
| 4,965,850 | 10/1990 | Schloemer | 455/33.2 |
| 4,977,399 | 12/1990 | Price et al. | 455/67.4 X |
| 4,977,612 | 12/1990 | Wilson | 455/166.1 |
| 5,023,900 | 6/1991 | Tayloe et al. | 379/59 X |
| 5,067,172 | 11/1991 | Schloemer | 455/34.1 |
| 5,093,924 | 3/1992 | Toshiyuki et al. | 455/33.2 |
| 5,093,927 | 3/1992 | Shanley | 455/34.1 |
| 5,093,928 | 3/1992 | Kage | 455/34.2 |
| 5,142,691 | 8/1992 | Freeburg et al. | 455/63 X |
| 5,144,642 | 9/1992 | Weinberg et al. | 375/228 |
| 5,203,012 | 4/1993 | Patsiokas et al. | 455/34.1 |
| 5,239,676 | 8/1993 | Strawczynski et al. | 455/62 X |
| 5,276,908 | 1/1994 | Koohgoli et al. | 455/34.1 |
| 5,410,737 | 4/1995 | Jones | 455/33.1 X |

OTHER PUBLICATIONS

Application for a New Radio Station Authorization to Construct and Operate a Personal Communications Network Within the Vicinity of Houston, Texas, Southwestern Bell Corporation, Jul. 1991.

Generic Framework Criteria for Universal Digital Personal Communications System (PCS), Bellcore, FA–NWT–001013, Issue 3, Dec. 1990.

5,752,164

AUTONOMOUS REMOTE MEASUREMENT UNIT FOR A PERSONAL COMMUNICATIONS SERVICE SYSTEM

RELATED APPLICATION

This is a continuation-in-part of application Ser. No. 07/874,370, filed Apr. 27, 1992, now U.S. Pat. No. 5,410,737, entitled "FREQUENCY AGILE SHARING TECHNOLOGY (FAST) FOR A PERSONAL COMMUNICATIONS SERVICE SYSTEM."

BACKGROUND OF THE INVENTION

Personal Communications Services ("PCS") are the focus of an exceptional amount of interest, both in the United States and around the world. The global telecommunications network today forms the infrastructure for our information-based society. The need for instantaneous communications capability is critically important in today's information economy, as the unprecedented growth of cellular telecommunications demonstrates. PCS will permit millions of people worldwide to initiate person-to-person communications, using small and inexpensive low-power telephone handsets. People no longer will be tethered to stations at which telephone calls may be placed and received, but will be able to communicate freely whether at home, at work, or in the public environment.

PCS will enhance the nation's productivity and the quality of our lives. It will be a truly personal service. Although PCS will provide competition to cellular, paging, and other services, it will be unlike cellular—at least 95 percent of the airtime of which is paid for by businesses—in that PCS will make portable communications available to great numbers of people who have been unable to participate in today's mobile telecommunications revolution. It will enable Eastern Europe and Third World countries to leapfrog over their crippled infrastructure handicaps. It will contribute formidably to American exports and economic well-being. In the long term PCS may eventually provide competition to the telephone companies' local exchange monopolies.

PCS systems are comprised of multiple base stations that may be linked in a variety of ways to comprise an integrated telecommunications system. Base stations receive communications from PCS handsets and route those communications to the intended source, using either the PCS system independently or using the PCS system to route the communications to the public switched telephone network ("PSTN"). Base stations also transmit communications to PCS handsets from other sources on the PCS system or from the PSTN. PCS systems may incorporate independent telephone switching and control centers or PCS operators may cooperate with local exchange carriers to utilize existing switching facilities operated by those carriers. Subscriber access to the PCS system is established by a radio communication link between the PCS handset and the base station.

The geographic area served by PCS operators is divided into a number of zones or cells, each of which is served by at least one base station. Dividing the geographic area into relatively small cells permits extremely efficient use of the spectrum because frequencies can be reused in geographically separated cells. Frequency reuse also permits large numbers of subscribers to be served by the system because numerous frequencies may be available in a given cell. PCS systems also may incorporate the capability of transferring a subscriber unit with a call in progress from cell to cell as the subscriber moves within the service area.

The implementation of PCS technology differs from traditional cellular telecommunications in that cellular systems have been designed with cells of comparatively large radii, requiring relatively high-power subscriber units. This design follows logically from the basic initial purpose of cellular telephone—to permit mobile telephone use in automobiles. Although hand-held portable cellular units have been developed, the comparatively high power required by cellular systems limits the ability of such handsets to use small and light power sources. PCS systems, in contrast, use a great number of much smaller radius cells, permitting PCS handsets to operate at much lower power because the handset-to-base station signal need only travel a relatively short distance. PCS handsets can thus be small, light and inexpensive. PCS handsets also can have applications in private local-area networks within buildings and for data transmission.

The essential distinguishing technical characteristic of PCS is that the frequencies identified for PCS by the U.S. Federal Communications Commission and spectrum-allocation bodies throughout the world are currently occupied by other users. In the United States and several other countries, PCS will be required to share this spectrum with existing users. The FCC allocated the 1.85–1.99 GHz band to PCS. This band is occupied by private operational fixed microwave users, which use the band for point-to-point microwave transmissions. The challenge to PCS operators will be configuring systems around existing users without causing interference to those users. As a comparison, cellular licensees have clear spectrum and thus are concerned only with intrasystem (as opposed to intersystem) interference. U.S. Pat. Nos. 4,144,412, 4,736,453, 4,481,670 and 4,485,486 are examples of such concepts, which will not account for interference concerns between PCS licensees and point-to-point microwave users.

Point-to-point microwave systems can employ different power levels, antenna gain, modulations, channel bandwidths, and other technical characteristics, and microwave usage varies significantly from area to area. In some areas, up to 100 MHz of spectrum with the 1.85–1.99 GHz band may be available for implementation of PCS, while in other areas as little as 25 MHz of spectrum may be available. To meet this challenge, the PCS industry will need a system and method for engineering PCS frequency use around existing microwave users that can be readily adapted to any area and most efficiently make use of the available communications spectrum in that area. Such a system must fully protect existing microwave users from interference and should take advantage of PCS technology advances in equipment and ensure that these advances are not inhibited nor hampered. The invention described in this Application is designed to serve this need.

SUMMARY OF THE INVENTION

The present invention, a Frequency Agile Sharing Technology (FAST) system controls frequency usage within a PCS system to allow PCS systems to coexist in the same frequency band as Private Operational Fixed Microwave Service (POFS) systems without mutual interference. The present invention also controls frequency usage within a PCS system to eliminate interference within the PCS system. The invention combines theoretical radio frequency (RF) interference analyses with measurements of actual frequency usage. This interference elimination system allows for efficient and coordinated dynamic frequency allocation planning and management.

The present invention controls frequency assignments to each PCS base station. The present invention also controls which frequency at a particular base station is utilized when the system is accessed (i.e., a call is placed or received).

The mechanisms employed by the present invention to control frequency assignments to PCS base stations are an intersystem interference analysis, an intrasystem interference analysis, a channel use verification (CUV) procedure and a measured data analysis/measured data integration (MDA/MDI) procedure. These mechanisms are performed by a centralized controller, termed the Channel Utilization Controller (CUC). The CUC is comprised of interference analysis/frequency planning computer programs with supporting databases and data communication links to the PCS base stations via the PCS Telephone Switching Office (PTSO).

The mechanism employed by the present invention to control frequency assignments to each subscriber unit access of the PCS system is a Channel Selection Process (CSP) performed by the PCS base station during the call set-up procedure.

The first mechanism is an intersystem interference analysis performed by the CUC. The CUC performs a theoretical analysis of PCS channels that can be used without interference at each base station. This analysis is based upon the CUC's technical databases, propagation predictions and interference calculations. The technical databases contain information on all PCS base stations and all POFS stations including the following; transmit and receive frequencies, latitude, longitude, ground elevation, antenna, antenna height, transmitter power, transmission line losses and antenna gain. The CUC evaluates interference to POPS stations from PCS base stations and from PCS subscriber units. The CUC also evaluates interference to PCS base stations and to PCS subscriber units from POFS stations. In order to evaluate interference to and from PCS subscriber units within the service area of a PCS base station, the CUC utilizes a series of grid points around the PCS base station. Interference to and from PCS subscriber units is evaluated at each grid point location.

The second mechanism is an intrasystem interference analysis performed by the CUC. The CUC performs an analysis similar to the intersystem interference analysis except that interference to PCS subscriber unit signals received at PCS base stations from other PCS subscriber units is evaluated at PCS base stations. Additionally, interference to PCS base station signals received at PCS subscriber units from other PCS base stations is evaluated at each grid point.

The result of the intersystem and intrasystem interference analyses is the creation of an Available Channel List (ACL) for each PCS base station. Any channel that would cause or receive excessive intersystem or intrasystem interference is removed from the ACL by the CUC.

The third mechanism employed is a Channel Use Verification (CUV) procedure performed by the PCS base stations. The base stations measure signal strengths in all POFS microwave channels and all PCS channels and upload the measured data to the CUC. This system is unique in that it is an autonomous measured signal gathering system. Each base station, or other fixed site, is equipped with a Remote Measurement Unit (RMU). The RMU is a microwave receiver and power measurement device under microcontroller control. The RMU communicates to the CUC via modem through the Public Switched Telecommunications Network (PSTN) or through other means, such as a wireless RF communications path.

Upon direct command from the CUC or as scheduled by the CUC, the RMU takes sensitive and accurate measurements in narrow frequency bands. Once the measurements are taken, the RMU microcontroller processes the measured data and formats and stores the measured data into data files. Position information on the location of the base station RMU is not necessary since such information is already available in the CUC base station database. Either on a scheduled basis or upon command from the CUC, the measured data files are uploaded from the RMU to the CUC.

This measured CUV data is used by the CUC to verify the accuracy of the intersystem and intrasystem interference analyses at the PCS base stations and ensure that the ACL includes only interference-free channels.

The present invention also employs a Test Mobile Unit (TMU) which measures signal strengths in all POFS microwave channels and all PCS channels. The TMU is used to accumulate CUV measured data in the service area of a PCS base station. The TMU is comprised of a GPS receiver or other positioning device, a Remote Measurement Unit (RMU) and an omnidirectional antenna. The mobile RMU differs from the fixed site (or base station) RMU in that the microcontroller is a personal computer in the TMU. The mobile RMU is preferably directed to make measurements while the TMU is in motion in order to average out attenuation and multipath effects.

The TMU associates a coordinate location with each CUV measurement, preferably by utilizing the global positioning satellite (GPS) receiver or other locational analysis device. The measured data is uploaded to the CUC via a PCS base station, or stored electronically for later input to the CUC. The CUC utilizes the coordinate information associated with a TMU CUV measurement to compare TMU measured values to theoretical values calculated at the nearest base station grid point. This TMU CUV data is used by the CUC to verify the accuracy of the intersystem and intrasystem interference analyses at base station grid point locations.

The fourth mechanism employed is a measured data analysis and measured data integration (MDA/MDI) performed by the CUC. After receiving the CUV measured data, the CUC compares actual measured signal strengths to the theoretical predicted signal strengths (determined in the intersystem and intrasystem analysis) to either verify or modify the ACL. Utilizing actual measured values to verify predicted values ensures that each channel in the ACL will neither cause nor receive interference. The PCS base station CUV data obtained from the RMU allows the CUC to verify interference predictions between PCS base stations and POFS stations. The TMU CUV data allows the CUC to verify interference predictions between PCS subscriber units and POFS stations. Both the PCS base station CUV data obtained from the RMU and the TMU CUV data allow the CUC to verify intrasystem interference predictions.

The result of these four mechanisms is an ACL for each PCS base station that only includes interference-free channels. The CUC downloads the ACL to the PCS base station or alternatively downloads the ACL to an Operations Maintenance Center (OMC) and stores the data for future retrieval. If an OMC is employed, it controls the frequency use of the PCS base stations. In such an embodiment, the OMC is preferably a UNIX-based machine that connects directly to the CUC. These four mechanisms are performed when a new PCS base station is brought on-line, or modified, upon the request of the system operator or at specified intervals (i.e., every night or as often as necessary to maintain interference-free PCS and POFS communications), but not performed upon each system access by a subscriber unit.

The fifth mechanism employed is a Channel Selection Process (CSP) performed by the PCS base station during the call set-up procedure. This mechanism is employed upon every system access by a subscriber unit. As a result of the above four mechanisms, the ACL is developed and sent to each corresponding base station. Frequencies for establishing communications between a subscriber unit and a base station for a specific call are selected from the ACL. A further security against interference is provided by the CSP performed during the call set-up procedure. When a subscriber unit accesses the PCS system, both the subscriber unit and the base station measure the signal strength on each respective receive channel in the ACL. The subscriber unit transmits its measured data to the PCS base station which selects the best available channel pair for the voice/data link, i.e., the frequencies that will provide the highest carrier to interference (C/I) ratio.

Access to system traffic data allows the system operator to utilize the CUC to identify base stations requiring additional channels to handle busy hour traffic and base stations under-utilizing their channel capacity. Integrating the interference and system traffic analyses, the system operator can utilize the CUC to re-configure system frequency use to optimize system capacity. The system operator can obtain frequency deployment, system usage, coverage and interference reports from the CUC periodically, upon modification or upon request.

Accordingly, a primary objective of this invention is providing personal communications service to subscribers utilizing small, low power and lightweight handsets in the same frequency band as private fixed operational fixed microwave systems.

It is an object of the invention to provide instantaneous, interference-free communications capability anywhere within the PCS service area, indoors or outdoors.

It is an object of the invention to use frequency agility and low power signals so as to eliminate harmful interference to or from other communications systems.

It is an object of the invention to simultaneously transmit personal communications service signals in the same frequency band as existing microwave signals without appreciable interference to any signal.

It is an object of the invention to make frequency assignments subject to noninterference between signals within the system, i.e., intrasystem.

It is an object of the invention to make frequency assignments subject to noninterference between PCS signals and POFS signals, i.e., intersystem.

It is an object of the invention to increase communications capacity in a PCS system by more efficient use of the available spectrum.

It is an object of the invention to provide an autonomous fixed site remote measured data gathering system.

It is an object of the invention to provide an autonomous mobile site remote measured data gathering system.

It is an object of the invention to base design of a personal communications network on capacity requirements and actual propagational environment rather than on an inflexible communications plan.

These and other advantages, features and objectives of the invention and the manner of attaining them will become apparent and the invention will be best understood by reference to the following description of the embodiments of the invention in conjunction with the accompanying drawings and appended claims.

DESCRIPTION OF THE PREFERRED EMBODIMENT

Figure 1:
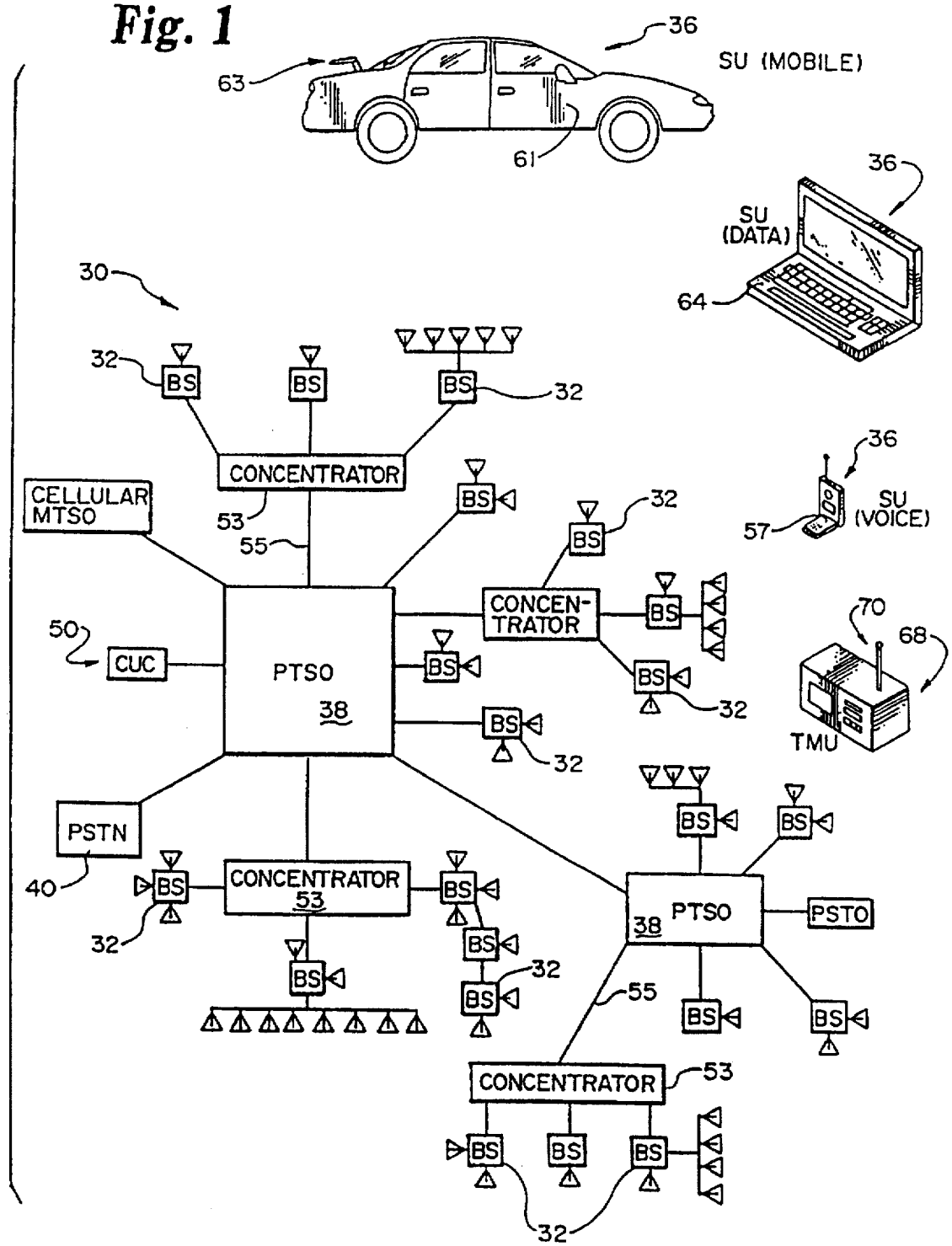
FIG. 1 is a diagrammatic representation of a personal communications service (PCS) system displaying various elements of the system.

FIG. 1 illustrates one embodiment of a Personal Communications Service (PCS) system utilizing a Frequency Agile Sharing Technology (FAST) system 30 for providing high capacity, low cost portable telephone service in a shared frequency band with Private Operational Fixed Microwave Service (POFS) stations. Bellcore Framework Technical Advisory FA-NWT-001013, Issue 2, December 1990, "Generic Framework Criteria for Universal Digital Personal Communications Systems (PCS)", provides an alternate functional description of a PCS system. The FAST system 30 is compatible with the Bellcore description of PCS systems. The FAST system 30 includes a plurality of base stations 32, a multitude of subscriber units 36 and one or more PCS Telephone Switching Offices (PTSO) 38 interconnected with the Public Switched Telephone Network (PSTN) 40 or other switching centers such as a cellular Mobile Telephone Switching Offices (MTSO). Interconnection is preferably accomplished with a Type II interconnect to a class four central office. The Channel Utilization Controller (CUC) 50 controls the assignment of frequencies to each base station 32.

Base stations 32 include radio frequency (RF) signal transceivers for establishing radio communications links with subscriber units 36. Base stations 32 include a Remote Measurement Unit (RMU) 400. The RMU 400 is comprised of a tunable receiver, power measurement device 408, modem 416, and a microcontroller 404. Under control and direction by the CUC 50, the RMU 400 takes power measurements across a given bandwidth, processes and formats such information, and forwards the data to the CUC 50. The RMU 400 is connected by switch 424 to the directional antennas 432 at the base station 32.

Base stations 32 are interconnected to the PTSO 38 either directly or through concentrators 53 which reduce the cost of backhauling traffic by multiplexing the voice/data traffic of multiple base stations 32 onto a single communications link 55. In some PCS embodiments, the Base Station Controllers (BCCs) act as concentrators, as well as provide mobility management functions. Due to power constraints of small lightweight hand held portable phones 57, the PCS system preferably uses smaller radius base station 32 coverage areas than other communications systems such as cellular telephone systems. The base station 32 coverage areas can be enhanced by the use of distributed antenna systems, particularly to improve PCS service in indoor environments.

The use of broadband linear amplification systems allow base stations 32 to be tuned remotely to operate on any channel in the authorized band without the need for technicians to physically modify the base station 32. This method of amplification differs from traditional channel combining networks which utilize individual channel amplifiers combined through a multicoupler.

Subscriber units 36 communicate to base stations 32 by a wireless RF communications path. Subscriber units 36 can be portable telephones 57, portable phones with adapter units in automobiles 61 to allow the portable unit to utilize antennas 63 mounted on the exterior of the automobile 61, portable computers 64 or other communications devices. Examples of such devices include commercially available lightweight telephone handsets such as the Motorola Silverlink 2000 Personal Telephone or the Motorola Microtac Lite, commercially available adapters such as the Motorola S1757 Digital Hands Free Adapter or the Motorola S1945 Digital Personal Communicator Telephone Extended System, or commercially available data terminals such as the IBM 9075 PC radio or the Apple Powerbook equipped with a radio interface card.

The Test Mobile Unit (TMU) 68 has an omnidirectional antenna 70 attached to a tunable receiver 408 controlled by a microprocessor 436 with data storage capacity for performing the Channel Use Verification (CUV) measurement procedure. Since the location of the TMU 68 is required with the interference calculations, the TMU 68 preferably includes a Global Positioning Satellite (GPS) receiver 440 and antenna 460 to fix location coordinates.

Figure 2:
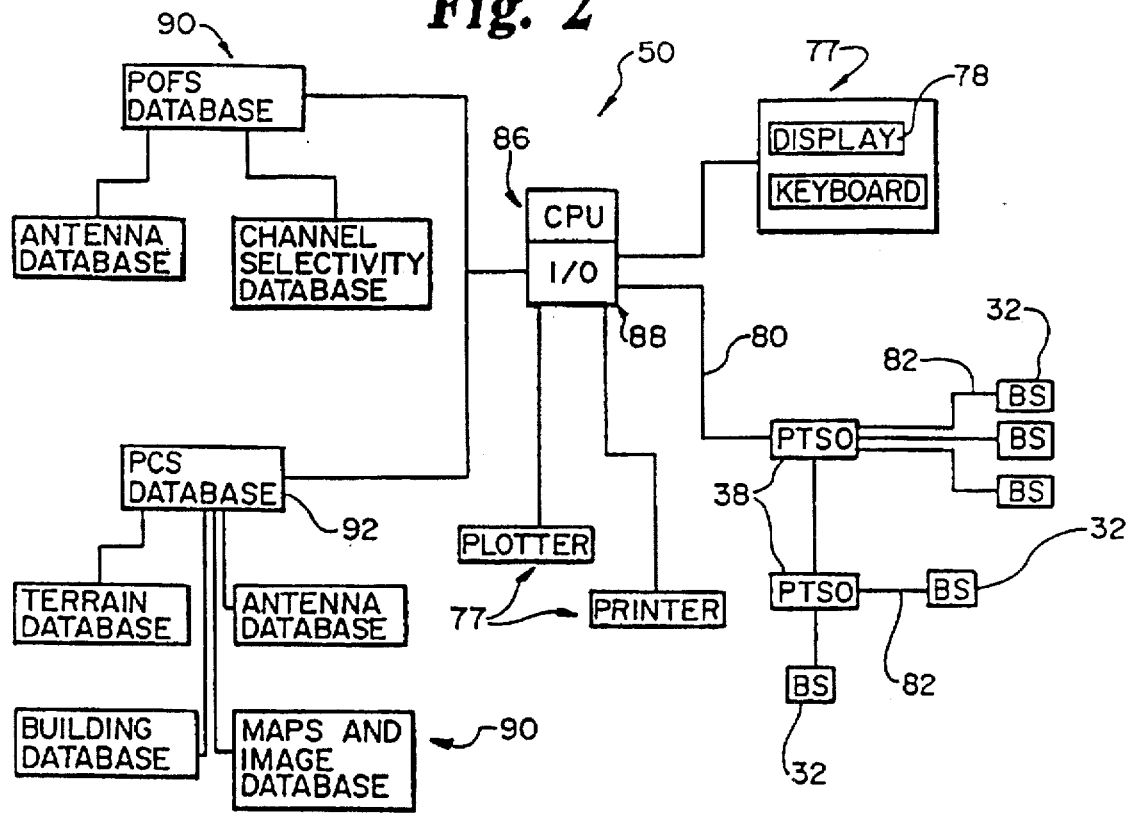
FIG. 2 is a block diagram of the components of the channel utilization controller (CUC).

FIG. 2 is a block diagram of an important feature of the FAST system, the Channel Utilization Controller (CUC) 50. The CUC 50 controls the frequency assignments to the PCS base stations 32 using a central processing unit 74, input/output devices 77 and dedicated communications links 55, 80, 82 to the PCS base stations 32 via the PTSO 38. One embodiment of the CUC 50 is a microcomputer 86 which would house electronic storage media, read-only memory (ROM), random access memory (RAM), I/O interfaces 88 and a commercially available microprocessor such as the Intel 80386. The electronic storage media, RAM, ROM and I/O devices 77 may be any commercially available devices that are suitable for operation with the type of microprocessor selected. The CUC 50 operating system, interference analysis programs, measured data analysis programs, I/O interface programs, data communication programs and supporting databases 90 are stored on a hard disk drive or other electronic storage media. Depending on the application, external memory devices, such as compact disk (CD) or Bernoulli box, may be required to store supporting databases 90. The preferred embodiment includes a disk or tape back-up of the CUC 50 software to allow system recovery in case of failure.

The PCS system architecture described below is based upon one possible PCS standard. The FAST system 30 is not dependant upon this architecture. Rather, this architecture is presented to allow a more thorough description of the operation of the FAST system 30. The PCS architecture discussed below is based upon the Groupe Special Mobile, now also called Global System for Mobiles (GSM) European digital cellular standards. The GSM standard, upbanded to the 1710–1880 MHz band has been selected for Personal Communications Network (PCN) systems in the U.K. and is under consideration in Germany. This upbanded GSM standard is referred to as the DCS-1800 standard and is a Time Division Multiple Access (TDMA) Frequency Division Duplexed (FDD) architecture. This standard uses a 200 kHz RF channel with eight voice slots per carrier. One time slot from one carrier in each sector is used as a control (signalling and access) channel. U.S. Standards bodies are now adopting a revised version of the GSM for the 1850 to 1990 band (referred to as PCS-1900 or DCS-1900).

Another possible PCS architecture is based upon the Code Division Multiple Access (CDMA) system under development by Qualcomm, Inc. for U.S. digital cellular systems. The Qualcomm CDMA standard is also under consideration by U.S. Standards bodies. The FAST system 30 can be configured to operate with either of these two or any other relatively narrowband PCS system architecture, narrowband relative to POFS RF channel bandwidths (i.e. 5 MHz or less). The FAST system 30 can also be configured for FDD PCS architectures utilizing a variable transmit-receive separation or for Time Division Duplexed (TDD) PCS architectures in which transmit and receive functions are performed on distinct time slots on the same frequency.

Figure 3:
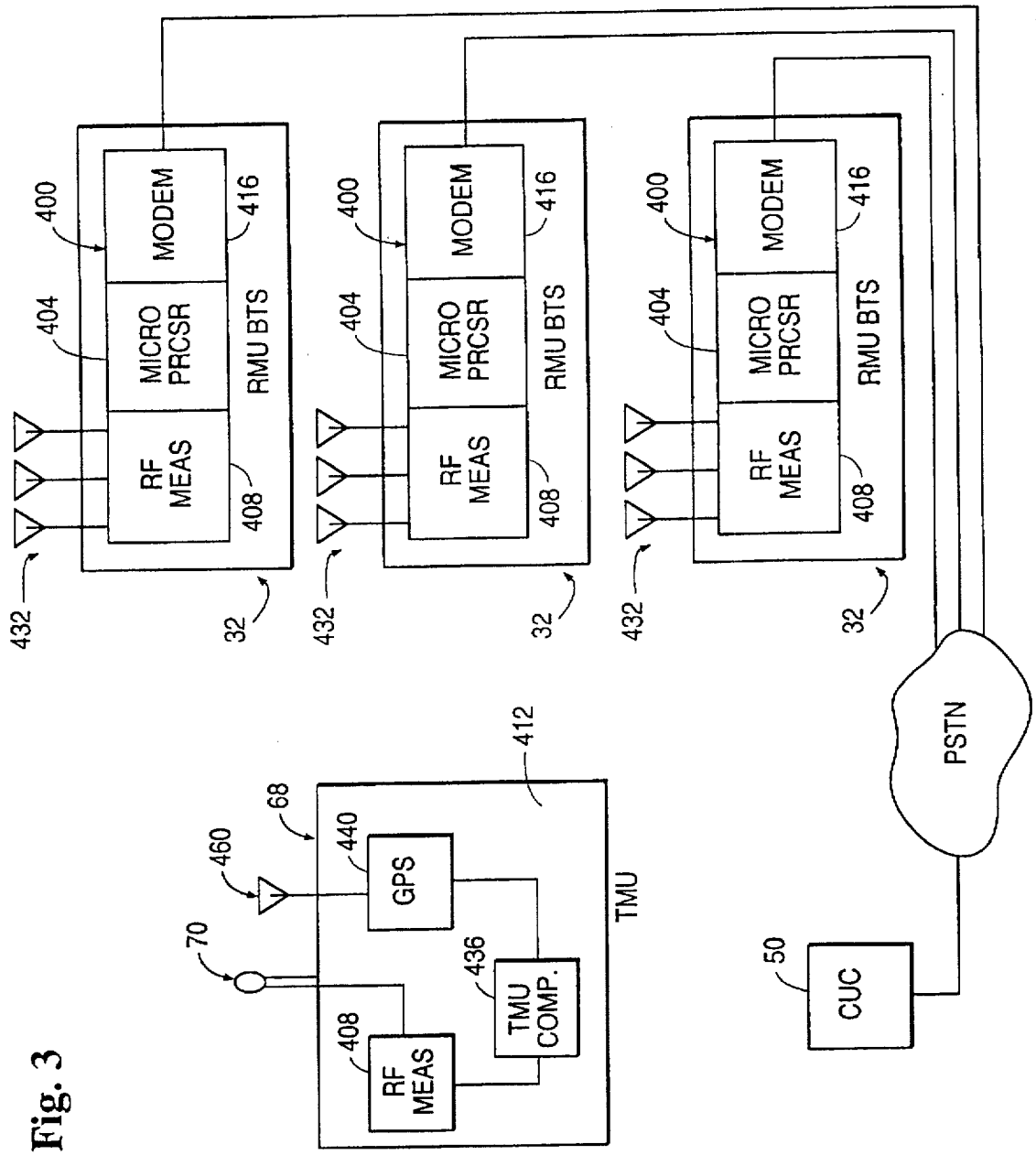
FIG. 3 is a diagram showing the base station Remote Measurement Unit (RMU).

FIG. 3 shows the FAST base station RMU 400 configuration. As shown in FIG. 3, the RMU 400 preferably connects to the CUC 50 via a modem 416 through the Public Switched Telecommunications Network (PSTN).

Figure 4:
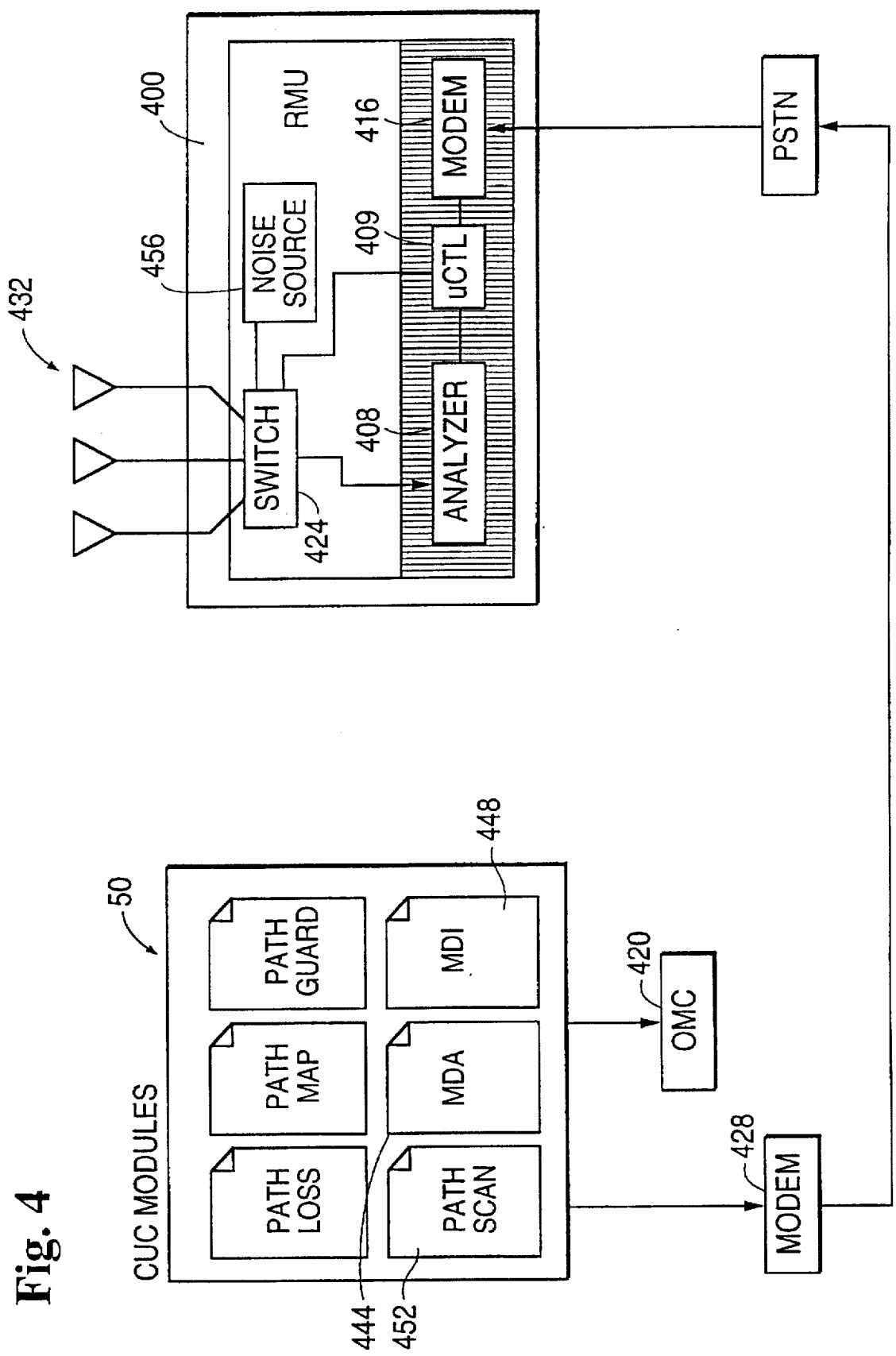
FIG. 4 is a block diagram of the components of the Remote Measurement Unit (RMU) and the connection with the modules of the Channel Utilization Controller (CUC).

The RMU 400 in conjunction with the CUC 50 provides an autonomous remote measured data gathering capability for performing the Channel Use Verification (CUV) and the Measured Data Analysis/Measurement Data Integration (MDA/MDI). FIG. 4 is a functional diagram of the FAST system showing the interference analysis software modules in the CUC 50, the PSTN interface to the Remote Measurement Units (RMUs) 400 and the components of the RMU 400.

The RMU 400 is a microwave receiver and power measurement device preferably housed in a rugged chassis for unattended outdoor use or preferably integrated directly into the PCS base station 32. The RMU 400 may be operated from a fixed site or from a moving vehicle. In a preferred embodiment, the RMU 400 is located at the base station 32 and in the Test Mobile Unit (TMU) 68.

In general, the RMU 400 provides sensitive and accurate measurements in narrow frequency bands upon command from the CUC 50, preferably on a scheduled basis. The RMU 400 then takes measurements across the band of interest. Once measurements are taken by the RMU 400 across the frequency band of interest, the RMU 400 processes, formats and stores the measurements. Upon a command from the CUC 50, the measured data files are uploaded from the RMU 400 to the CUC 50. Alternatively, the RMU 400 can upload the files on a scheduled basis.

In order to actually measure the potential interference between the PCS base station 32 and a POFS site, the CUC 50 establishes a communication link to an RMU 400, preferably deployed in the PCS base station 32, through the PathScan module 452. The Pathscan module 452 controls the RMU 400. More specifically, the CUC 50 connects to a modem 428 through the Pathscan module 452, as shown in FIG. 4. Communications between the RMU 400 and CUC 50 preferably occur over the Public Switched Telecommunications Network (PSTN). Alternatively, other communications transmissions systems can be used including an X.25 packet switched network, cable, wireless networks, etc. In order to achieve reliable data transmission, the Pathscan module 452 preferably uses header and footer protocols on packets sent between the CUC 50 and RMU 400. Preferably included in the data packets are bits allocated for a CRC check.

The Pathscan module instructs the RMU 400 to perform the following tasks, among other tasks: (1) measure the signal power and store the measured data; (2) instruct the RMU 400 to work under a predefined schedule (including such information as time to commence measurements); and (3) upload measured data upon request.

To send commands requesting the RMU 400 to take signal measurements, the CUC 50 dials up the RMU 400 and sends the predefined schedule and band table in communications packets comprising the "Measure Data" command. A sample set of commands between the CUC 50 and RMU 400 is shown in Appendix A. The Measure Data command provides the microcontroller 404 with the predefined schedule which dictates when the receiver 408 must scan the bands listed in the band table. The band table contains a list of frequency bands for which the RMU 400 must take power measurements. A single entry in the Band Table consists of the following fields: Input Identifier; Start Frequency; Stop Frequency; Intervals between Samples; Number of Complete Scans; Channel Bandwidth; the Number of Samples (to average over to determine the power); identification of one of the three antenna sectors as input to the receiver.

The microcontroller 404 accepts and interprets the Measure Data Command. While performing the Measure Data command, the microcontroller 404 packages and stores the measurement results in data files which are stored in non-volatile memory for later forwarding to the CUC 50.

On receipt of the Upload Data command, the microcontroller 404 provides the results of all Measure Data commands issued since the last Upload Data command was issued. The microcontroller 404 maintains pointers in memory to differentiate measured data which has been uploaded from measured data which has not been uploaded.

On receipt of the Get Hardware Configuration command from the CUC 50, the microcontroller 404 shall report the RMU unit ID, the version number of the microcontroller software, and the number of RF inputs to the RMU 400.

All communications between the microcontroller 404 and the CUC 50 shall use the protocol shown below in Table I. The data may be commands from the CUC 50, or responses from the RMU 400.

TABLE I

CUC-RMU COMMUNICATIONS PROTOCOL

| BYTE # | Description | Value |
|---|---|---|
| 1 | Start Flag | 1111 1111 (binary) |
| 2 to N-3 | data | (variable) |

TABLE I-continued

CUC-RMU COMMUNICATIONS PROTOCOL

| BYTE # | Description | Value |
|---|---|---|
| N-2–N-1 | CRC16 | (data dependent) |
| N | End Flag | 1110 1110 (binary) |

As shown in FIG. 3, the RMU 400 preferably consists of a modem 416, microcontroller 404, fully-integrated microwave receiver and a spectrum analyzer 408. The RMU 400 is preferably a 19" rack-mountable chassis, 10" deep and 3" high, which is integrated into the PCS base station 32 or test mobile unit 68. In the base station configuration, shown in FIGS. 3 and 4, the RMU 400 is powered by the base station's internal DC power source.

The RMU 400 has three RF inputs and a fourth input for calibrating noise. Each RF input corresponds to one of the three directional antennas 432 directed to each sector of the three sector base station 32. The microcontroller 404 directs a switch 424 to select between the three RF inputs and a calibrating noise source 456. The analyzer 408 measures power spectral density on one of the three inputs in accordance with directions of the band table. The RF receiver and spectrum analyzer 408 preferably provide RF signals strength measurements down to −125 dBm with a +/−1 dB accuracy in a 25 kHz measurement bandwidth. Accuracy is achieved in the spectrum analyzer 408 through the use of narrow resolution filters. The base station RMU analyzer 408 preferably has a tuning range of from 1850 to 2000 MHz. The analyzer 408 preferably tunes in increments of 25 KHz with a tuning accuracy of 1 ppm (i.e., +/−1000 Hz at 2 GHz.). Table II, below, shows the preferred characteristics of the spectrum analyzer.

TABLE II

ANALYZER CHARACTERISTICS

| REQUIREMENT | SPEC |
|---|---|
| Number of Input Ports | 3 |
| Input impedance | 50 ohms |
| Input VSWR | 1.2:1 |
| Input Connectors | SMA |
| Port to Port Isolation | 40 dB |
| Tuning Range | 1840–2000 MHz capability |
| Tuning Accuracy | 1 ppm (± 1 KHz at 2 GHz) |
| System Noise Figure | 5 dB |
| Sensitivity | −125 dBm = 0 dB S/N in 25 kHz BW |
| Adjacent Channel Rejection | −60 dBc 25 kHz from carrier |
| Tx Power Rejection | −38 dBm incident, 1930–1970 MHz |
| Synthesizer SSB Phase Noise | −104 dBc/Hz at 25 Khz offset (goal) |
| Input Power Range | −125 to −30 dBm |
| Input IP3 | −30 dBm w/o AGC, 0 dBm with AGC |
| Tuning Step Size | 25 kHz |
| Tuning Speed | 2 millisec to settle to within 1 dB amplitude |
| Operating Temperature | 0–+65 Deg C. |
| Operating Humidity | 99% condensing |
| Calibration | Internal 30 dB noise source |

The present invention is capable of working with any one of several spectrum analyzers 408 known in the art. One example of a compatible analyzer is the HP Spectrum Analyzer No. 8594. Other analyzers could be used that operate using more sophisticated processing techniques, including digital signal processing. The spectrum analyzer 408 simply measures the power spectrum and does not determine whether the interference is microwave interference, other interference or a received PCS signal. Signal and interference discrimination is performed preferably at the CUC 50, as described below.

When making the measurements, the analyzer 408 preferably takes power measurements in increments of 25 kHz.

The receiver, spectrum analyzer 408, RF switch 424 and modem 416 are under the control of the RMU's microcontroller 404. One of the advantages of the present invention is that the microcontroller 404 works autonomously with the spectrum analyzer 408. No human monitoring of the system is necessary since all control is exercised by either the microcontroller 404 or the CUC 50. In fact, the microcontroller 404 also works autonomously with the CUC 50. The microcontroller 404 receives commands from the CUC 50, interprets the commands, commands the spectrum analyzer 408 to tune to and take power measurements over a certain frequency band, gathers the measured power values, formats the data into files and send these files back to the CUC 50 for processing.

The microcontroller 404 is preferably an off-the-shelf 386 based microprocessor with associated memory. However, several other processors could be utilized in the present invention. The microcontroller 404 preferably includes both non-volatile memory (e.g., PROM, EPROM, and/or EEPROM) and volatile memory (e.g., SRAM).

Once the microcontroller 404 receives its instructions from the CUC 50, the microcontroller 404 formulates a set of commands to control measurement by the spectrum analyzer 408. Once the appropriate start time occurs as indicated by the CUC 50, the microcontroller 404 instructs the spectrum analyzer 408 to set up to a certain tuning frequency and directs the switch 424 to enable one of the three RF input sources. The microcontroller 404 instructs the spectrum analyzer 408 in accordance with the total bandwidth to be scanned, the frequency scan increments and time interval between measurements, and directs the analyzer 408 to commence the scan. The microcontroller 404 then commands the analyzer 408 to report back the measured signal values.

Prior to selecting one of the RF inputs, the microcontroller 404 may direct the analyzer 408 to first perform a noise self-calibration test. In this case, the microcontroller 404 directs the switch 424 to enable the noise source 456. The self-calibration test involves providing an internally generated signal, with a well known amplitude, to the front end of the receiver and evaluating the resultant power measurement. With the measurement of the calibrated noise source, the spectrum can later be normalized by dividing the power by the spectral noise density. Therefore, any distortions occurring during the RF measurement, due to imperfect filtering for example, can be accounted for since the input noise is quantified.

After completing the scan of the frequency range as specified by the microcontroller 404 using one of the RF inputs, the microcontroller 404 requests that the analyzer 408 pass the measured values back to the microcontroller 404. The microcontroller 404 packages the measurements into data records. The packaging may include frequency channelizing the information. The data records are stored in memory until the CUC 50 requests an upload of these records. The microcontroller 404 has the ability to store multiple scans in associated nonvolatile memory. In fact, up to several days worth of scans may be stored by the microcontroller 404 in associated nonvolatile memory.

The microcontroller 404 connects through a modem 416 to communicate with the CUC 50. The modem 416 preferably operates at a data rate of 9.6 baud. The modem 416 preferably has a built-in MNP 2-4 and V.42 bis data compression protocol and a built-in V.42 forward error correction protocol.

When uploaded to the CUC 50, the measured data files are stored for processing by the Measured Data Analysis (MDA) module 444, shown in FIG. 4. The measured data files consist primarily of power measurements corresponding to 25 KHz channel bins. A sample file corresponding to 25 KHz bins with associated power measurements is shown in Appendix B.

Figure 5:
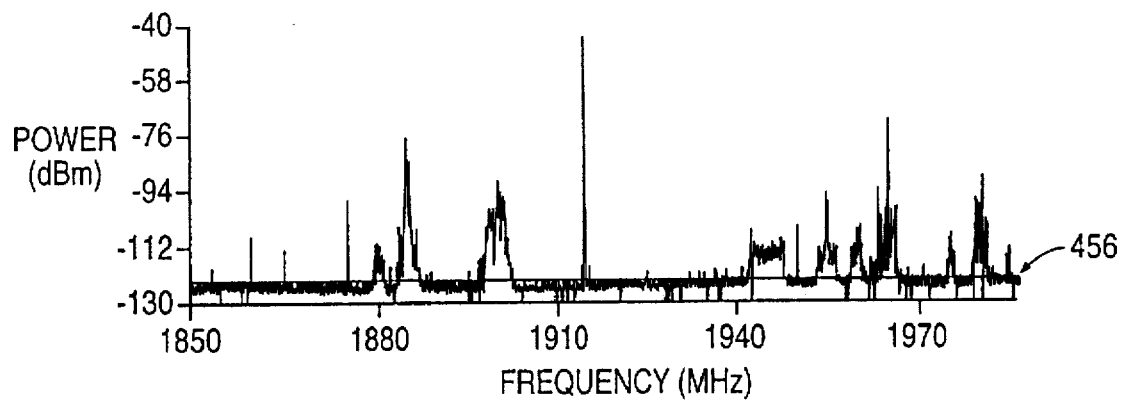
FIG. 5 is a plot of a sample power spectrum based on 25 kHz power measurements made by the RMU as processed by the CUC MDA module.

The MDA module 444 massages the raw data to establish a noise floor, to identify signals above the noise floor and to provide the total power and bandwidth of each identified signal. Preferably, the noise floor is determined based on the slope of the cumulative probability density function. The power spectrum based on the 25 KHz measurements shown in the file in Appendix B is provided in FIG. 5. The calculated noise floor is shown as the horizontal line 456 extending across the frequency spectrum.

After determining the noise floor, the MDA 444 sums up the powers into 200 KHz bins and generates a file comprising the list of bins and the corresponding power in each bin. Appendix C shows a sample 200 kHz bin file.

Figure 6:
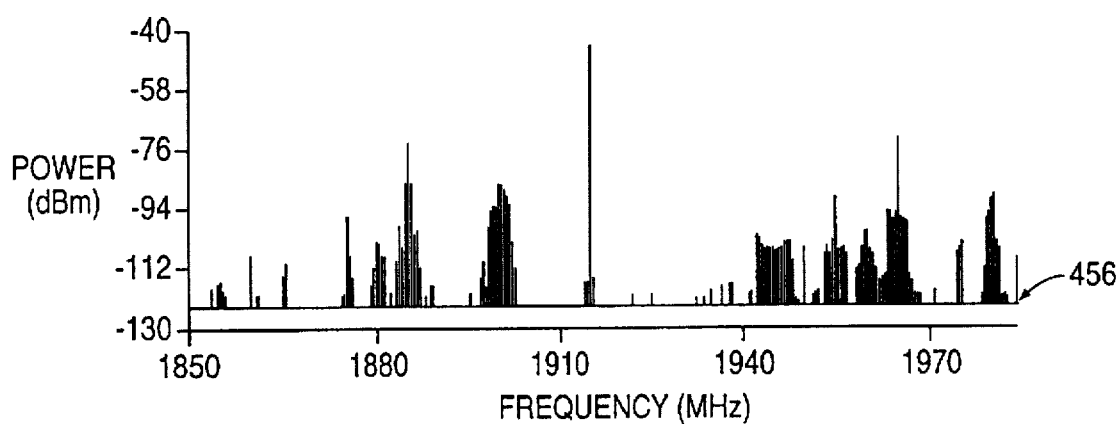
FIG. 6 is plot of a sample power spectrum based on 200 kHz summed measurements made by the RMU as processed by the CUC MDA module.

A plot of the sample 200 kHz power channel power measurements above the noise floor is shown in FIG. 6. As described below, the 200 kHz power measurements are used by the Measured Data Integration (MDI) 448 to determine interference from the microwave users to the PCS system.

Figure 7:
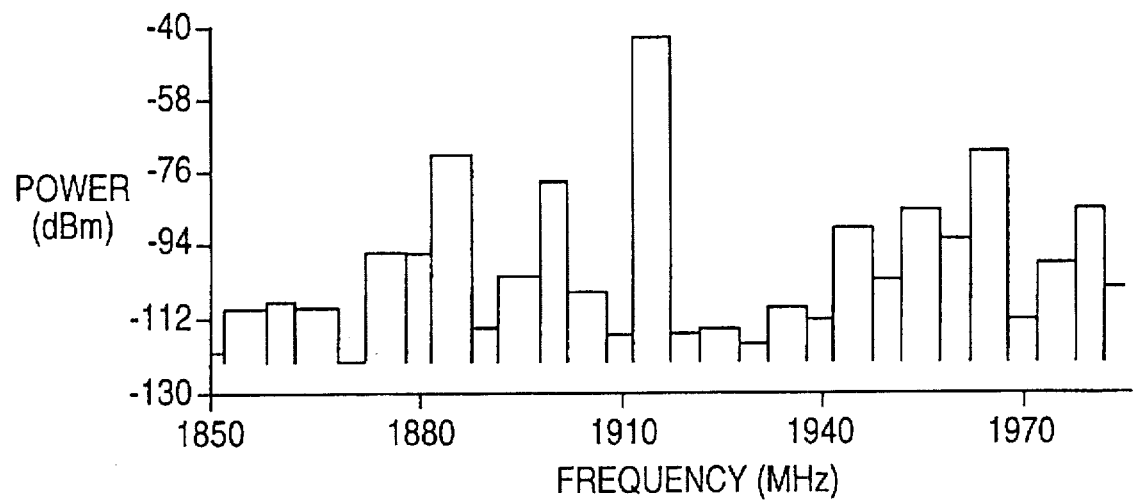
FIG. 7 is a plot of a sample power spectrum based on 5 and 10 mHz summed power measurements made by the RMU as processed by the CUC MDA module.
Figure 8:
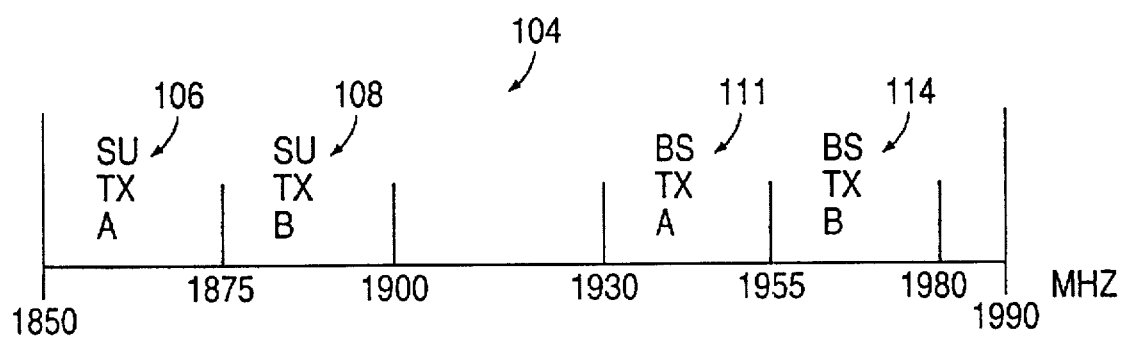
FIG. 8 is a diagram showing the division of the 1850–1990 MHz band for frequency allocation to the PCS service.

Next, the MDA 444 sums up the 25 kHz channel powers into the known 5/10 MHz licensed microwave frequencies in the particular PCS market area. Appendix D shows a sample 5 and 10 MHz bin file. A plot of these power measurements is shown in FIG. 7.

The measured data is used by the MDI 448 to verify the theoretical interference predictions (described below) to use in determining available PCS channels. The 200 kHz and the 5/10 MHz bin files are transferred from the MDA 444 to the MDI module 448. The MDI module 448 operates to discriminate between the microwave users and the PCS users, the purpose of which is described in later paragraphs below. The Measured Data Integration (MDI) module 448 attempts to match the 5/10 MHz actual power values with the known licensed OFS microwave sites in the area. For example, assume that the center frequency of a known OFS site in the area is 1915.00 MHz. Referring to FIG. 7, the MDI 448 is able to match the measured power of −43 dBm with the known OFS site. This measured value can then be compared to the theoretical value resulting from the theoretical FAST analysis described below to determine if the actual measurement is below or above threshold. If any of the measured values are either below or above theoretical values, the FAST recalculates the theoretical path losses based on the actual microwave signal values.

The description of the RMU 400 above has been provided with reference to a base station or other fixed site. A similar RMU configuration is also placed in the test mobile unit (TMU) 600. In this configuration, the microcontroller functions, described above, are preferably performed by a 386 based personal computer. The TMU personal computer 436 is attached to the spectrum analyzer 408 in the mobile unit 68 preferably by an RS232 interface, but could be any of a variety of other communications means. The mobile configuration differs from the fixed site configuration in that the PathScan module 452 is incorporated into the personal computer 436 in the TMU 68. Therefore, some of the CUC functions have been transferred into the TMU 68. In addition, the TMU 68 preferably has an omnidirectional antenna 70 instead of the three directional antennas 432 of the fixed site configuration. The omnidirectional antenna 70 acts to simulate the omnidirectional antenna associated with each subscriber unit 36.

Another difference between the RMU 412 onboard the TMU 68 and the RMU 400 at a fixed site is that the mobile unit RMU 412 is connected to a Global Positioning System (GPS) 440 or other positioning device. The positioning device 440 communicates directly to the computer 436 through another communications port. Information from a GPS receiver 440 is sent directly to the TMU computer 436. In one embodiment, the GPS communications link is a standard RS-232 serial line, but could be any of a variety of communications means.

A GPS program executing in the TMU computer 436 processes position information received from the GPS receiver 440. The GPS program checks whether incoming GPS data has been received through the communications port. When position data is detected by the GPS program, the position data is saved to a data file along with a time stamp.

The TMU computer 436 controls the spectrum analyzer 408 in the same manner as the operation of the microcontroller 404 in conjunction with the analyzer 408 at the fixed site, described above. The Pathscan module 452 contains instructions for performing the following tasks: (1) measuring the signal power; (2) date and time of start of scans; (3) date and time of stop; (4) number of complete scans; (5) channel bandwidth; and (6) the number of samples to average over to determine the power. These working schedules are preferably stored in a database in the TMU computer 436.

Preferably, power measurements are taken while the mobile unit 68 is moving. While measurements could be taken while the vehicle is not in motion, it is preferred to take the measurements while the TMU 68 is in motion so that multiple measurements can be taken at different locations. These measurements can then be used to average out the attenuation and multipath effects. The number of measurements taken are based on the velocity of the vehicle. The preferred mode of operation is obtaining fifty (50) measurements over a distance of forty (40) lambda (where lambda is wavelength). Since the frequency is preferably fixed at 2 GHz, lambda equals 0.15 meters. The 50 measurements are preferably used to characterize only one power measurement corresponding to one channel. Therefore, in this embodiment there are 50 measurements associated for each channel in the scan. In this embodiment 50 measurements are taken every 0.15 meters. Based on this factor and the velocity of the vehicle, the time intervals between measurements can be determined. The TMU 436 computer polls the GPS positioning device 440 to obtain the velocity of the vehicle.

The RMU analyzer 408 continues taking these measurement until the scheduled scan is completed. The TMU computer 436 then averages the corresponding 50 measurements for each center frequency. These values are time and position stamped (based on the GPS receiver input) and then saved to a data file.

The MDA 444 and MDI 448 post processing on the TMU data files is preferably performed when the TMU 68 returns to the CUC 50 location. Alternatively, the TMU 68 could transmit these data files back to the CUC 50 while still in the field by sending the data via wireless RP communications. In addition to these embodiments, the host computer 436 could also have the MDA and MDI modules 444, 448 implemented in it.

To illustrate the preferred embodiment of the present invention, a scenario demonstrating the operation of the FAST system 30 can be described as follows: This scenario involves a hypothetical PCS system in operation in the Washington-Baltimore area. The hypothetical PCS system shares the 1850-1990 MHz band with hypothetical POFS stations. A specific architecture is presented for the PCS system and parameters identical to actual point-to-point microwave paths in the vicinity are used for the POFS facilities. This scenario demonstrates how the CUC 50 is used by the system operator to evaluate the addition of a PCS base station 32 and how frequency usage is controlled by the FAST system 30 to prevent intersystem and intrasystem interference.

In this scenario, the Federal Communications Commission (FCC) licenses two common carrier PCS system operators (Licensee A and Licensee B) in each market. The FCC has not determined the geographic areas in which PCS licensees will be authorized to provide service. In this example, the authorized area for Licensee A is the Washington-Baltimore Major Trading Area identified in the Rand McNally 1992 Commercial Atlas & Marketing Guide. The 1850-1990 MHz band 104 is allocated to the PCS service as follows: the 1850-1875 MHz band 106 reserved for Licensee A subscriber unit 36 to base station 32 transmissions, the 1875-1900 MHz band 108 reserved for Licensee B subscriber unit 36 to base station 32 transmissions, the 1930-1955 MHz band 111 reserved for Licensee A base station 32 to subscriber unit 36 transmissions and the 1955-1980 MHz band 114 reserved for Licensee B base station 32 to subscriber unit 36 transmissions. A diagram of this division of the 1850-1990 MHz band is illustrated in FIG. 3. The division of the allocated frequency bands into distinct channels is provided in the table of Appendix E. For comparison, the division of the allocated frequency bands into distinct channels for the CDMA PCS system is provided in the table of Appendix F.

This frequency allocation scheme provides for an 80 MHz separation between transmit and receive (Tx-Rx) frequencies which matches the Tx-Rx frequency separation for POFS stations under Section 94.65 of the FCC Rules.

Appendix G is a table of POFS microwave channels. This provides advantages in spectrum sharing with POFS paths. American Personal Communications (APC), which holds an experimental license (Call Sign—KC2XDM, File No.—2056-EX-ML-91) from the FCC to test PCS services and technologies, has demonstrated that sufficient spectrum exists in the 1850-1990 MHz band 104 to launch the PCS service without migrating existing POFS licensees out of the band. This is described in American Personal Communications, "Frequency Agile Sharing Technology ("FAST") Report on Spectrum Sharing in the 1850-1990 MHz Band Between Personal Communications Services and Private Operational Fixed Microwave Service, Volume I", July 1991. In the very few areas where an existing licensee needs to be moved out of the band, APC has proposed a private negotiation between the parties. This is substantially what has been proposed by the FCC in FCC Notice of Proposed Rule Making, "In the Matter of Redevelopment of Spectrum to Encourage Innovation in the Use of Telecommunications Technologies", ET Docket No. 92-9, Adopted Jan. 16, 1992, Released Feb. 7, 1992. Under this negotiated migration, the 80 MHz Tx-Rx separation guarantees that when a POFS path is relocated (in frequency), both PCS base station 32 transmit and PCS subscriber unit 36 transmit frequencies will be available for the PCS system. It is recognized that some microwave links vary from the standard 80 MHz transmit-receive separation. In these isolated cases, moving the microwave link into another frequency band does not guarantee that both PCS base station 32 transmit and PCS subscriber unit 36 transmit frequencies will be made available to the PCS system.

In this scenario, Licensee A has initiated PCS service in portions of the Washington-Baltimore market area. Licensee A has determined that it will extend its PCS service to National Airport and the Crystal City area of Arlington, Va. The precise service area and expected demand have been determined by the marketing and planning groups of Licensee A. It is now the job of the radio frequency (RF) engineer to design a new base station 32 to serve the targeted area. The RF engineer accesses the CUC 50 to assist in this process.

Figure 9:
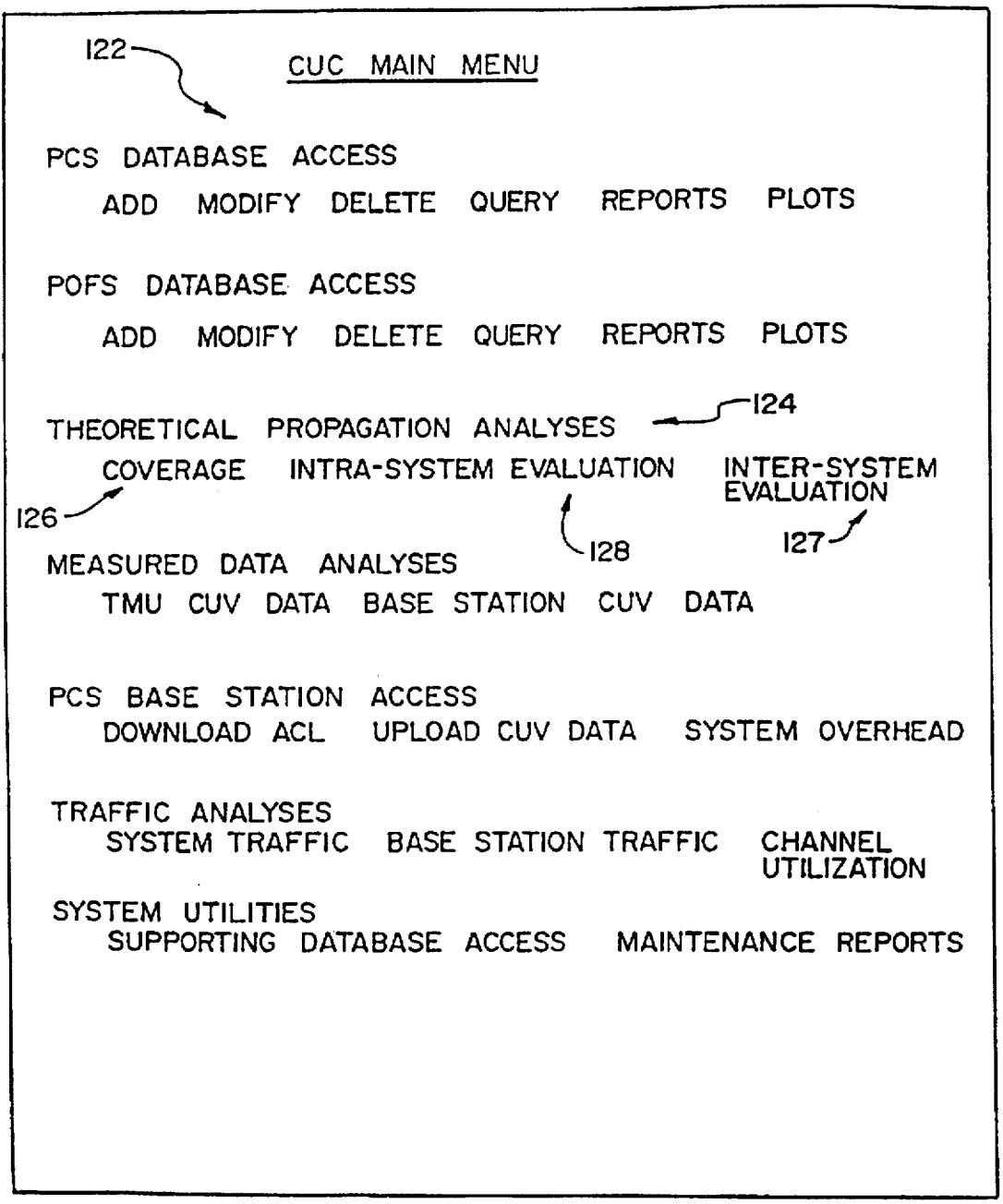
FIG. 9 is a representation of the main menu of the CUC.

A representation of the main menu 122 of the CUC 50 is provided as FIG. 9. The PCS base station database 92 supporting the CUC 50 contains entries for each base station 32. Sample database entries for two representative hypothetical PCS base stations, "Chester Building" 322 and "Smith Office Building" 323, are provided as the table in Appendix H. The POFS database 90 supporting the CUC 50 contains entries for every microwave station in the region. This would include all microwave stations which could cause or receive interference from a PCS system. The criterion for inclusion could be a fixed mileage separation, a coordinate block or by county. Sample database entries for six representative POFS microwave stations (3 paths) are provided as the table in Appendix I.

The RF engineer can identify several buildings as good potential candidates for the new base station 32 by accessing aerial or satellite photographs, building data and/or topographic maps of the area stored electronically in databases 70 supporting the CUC 50. The RF engineer now examines the operating parameters of the base station 32 (antenna, power, height, frequencies) to design a facility that will meet the coverage and capacity targets.

The RF engineer uses the CUC's 50 propagation models to examine coverage predictions for each potential site. A data base entry is created for the new base station 32 which allows alternate sites, multiple antenna configurations, antenna heights and radiated powers all to be easily examined by modifying the base station 32 parameters. The coverage predictions are overlayed on the digitized maps of the area and displayed on a system monitor 78. The RF engineer can also direct these displays to the system plotter 77 to create hard copies of the images for progress report meetings with site acquisition, marketing and management personnel.

After examining the coverage predictions of several potential sites, the RF engineer settles on the "Jeff Davis" location as the best potential site for the new base station 321.

To calculate coverage, the RF engineer selects the Theoretical Propagation Analyses 124, Coverage Option 126 from the CUC main menu 122. The CUC 50 then allows the RF engineer to select the propagation model to be used in the analysis. In the preferred embodiment, a variety of models are offered: Free Space, Hata, Longley-Rice and a proprietary model developed by the licensee. In this case, the RF engineer selects the Hata propagation model of the type described in Masaharu Hata, "Empirical Formula for Propagation Loss in Land Mobile Radio Services", IEEE Transactions on Vehicular Technology, Vol. VT-29, No. 3, August 1980. In the preferred embodiment, the propagation prediction models access information contained in the terrain and building databases.

The CUC 50 allows the RF engineer to adjust the service threshold (i.e., the minimum signal strength required by the receiver to provide reliable service) utilized in the study. The service threshold is utilized by the CUC 50 in the determination of channel availability as described below. In this case, the RF engineer selects a service threshold of −96 dBm.

Figure 10:
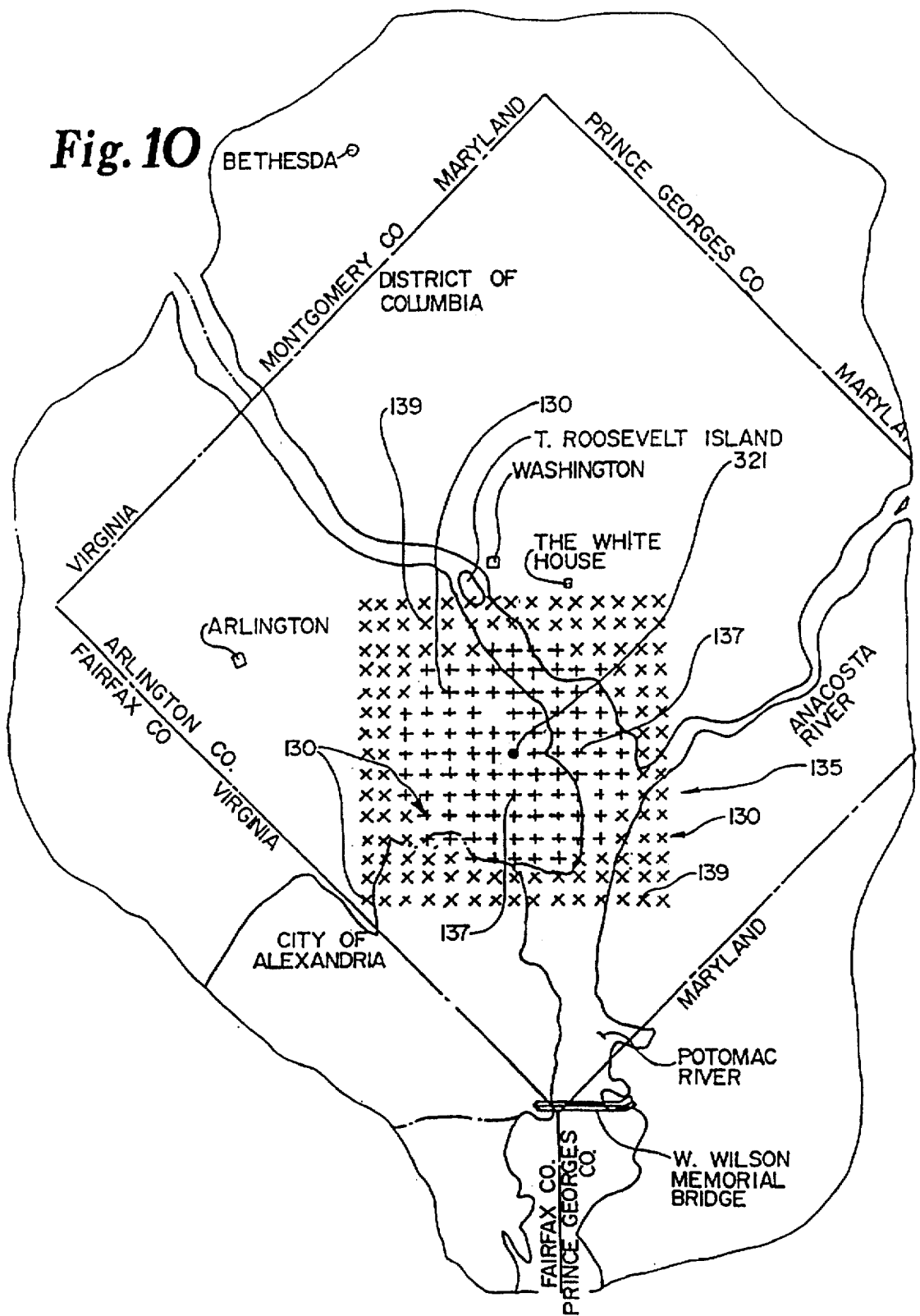
FIG. 10 is a map showing the grid points at the "Jeff Davis" site.

The CUC 50 predicts coverage by calculating the signal level at a series of points 130 in the vicinity of the site. These points are arranged in a grid 135, centered on the base station 321. The RF engineer can adjust the size of the geographic area included in the study by adjusting the size of the grid 135. In general the grid 135 size is selected to coincide with the base station 321 coverage area. The detail, or graininess, of the study is adjusted by selecting the number of points 130 within the grid 135. Increasing the number of points 130 in the grid 135, increases the number of calculations and therefore affects the length of time necessary to complete the study. The number of grid points 135 is, therefore, selected to balance detail and speed. In this case, the RF engineer selects a fifteen by fifteen (15 by 15) grid 135 with twenty (20) seconds of longitude between each column and fifteen (15) seconds of latitude between each row. This area is appropriate for the theoretical grid 135 based upon a 1.67 mile base station service radius described below. The grid 135 selected for the Jeff Davis site is shown on FIG. 10.

The CUC 50 allows the RF engineer to designate certain grid points as critical points 137. This designation is used by the CUC 50 in the determination of channel availability as described below. The RF engineer can specify critical points 137 in a variety of ways; all grid points 130, points within a specified distance or individually by row and column. In this example, the RF engineer designates all grid points 137 within 1.67 miles of the base station as critical. On FIG. 10, critical grid points 137 are shown as "+" marks, non-critical grid points 139 are shown as "x" marks. The grid point coinciding with the base station 321 site is shown as a circled "+" mark.

If the predicted signal strength value at a critical grid point 137 is below the selected service threshold, the CUC 50 provides the RF engineer with a report. This allows the RF engineer to modify the base station parameters to better serve the critical areas, or redesignate the particular grid points 130 as non-critical 139.

The grid points, critical designation and predicted signal strength values are stored in the PCS database 92. In this example, one of the grid points, grid point (row 5, column 6), is critical and the predicted Jeff Davis signal strength value at this point is −89.4 dBm. This predicted value is above the selected −96 dBm threshold.

Once the RF engineer has determined the parameters for the proposed base station that will allow the new facility to serve the targeted area, he uses the CUC 50 to determine the channel availability at the new facility.

The base station parameters selected for the new site, Jeff Davis 321, are depicted on the table of Appendix J. The CUC 50 is used to perform an analysis of channels that can be used at the Jeff Davis site and by subscriber units 36 in the Jeff Davis service area without interference to or from POFS stations (intersystem interference analysis) or other PCS base stations 32 (intrasystem interference analysis) using theoretical propagation predictions. These analyses yield the Available Channel List (ACL) for the new base station.

The RF engineer begins by selecting the Theoretical Propagation Analyses 124, Intersystem Evaluation 127 from the main menu 122 of the CUC 50. A flow chart for the intersystem interference analysis is provided as FIG. 11.

Figure 11:
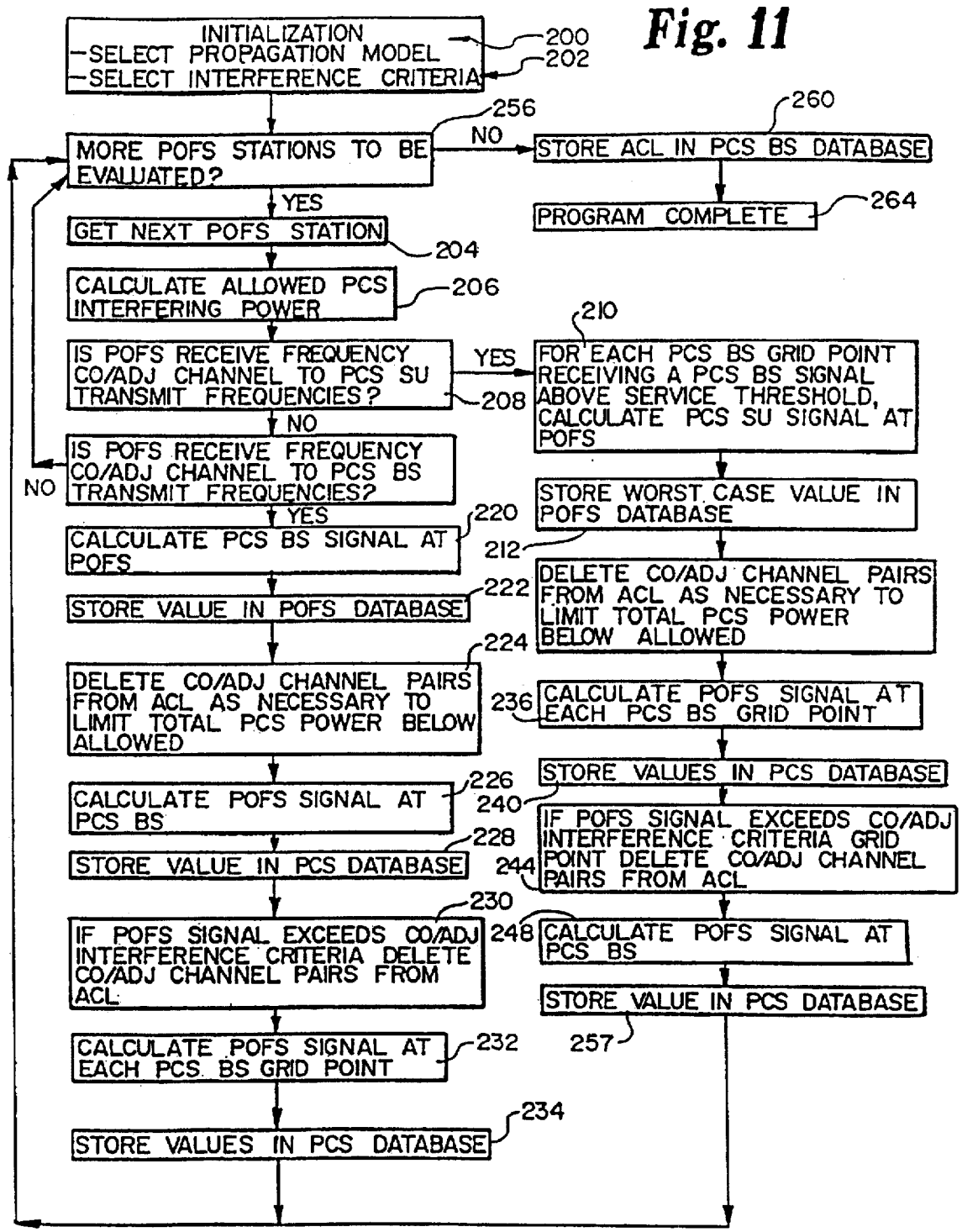
FIG. 11 is a flow chart used by the CUC for performing the theoretical intersystem interference analysis.

Referring to FIG. 11, the RF engineer selects the propagation model 200 to be used in the analysis. In this case, the RF engineer selects the Hata propagation model.

The CUC 50 then provides the RF engineer with the opportunity to adjust the PCS-POFS interference criteria 202. The default values for interference to PCS facilities from cochannel POFS facilities is 12 dB. This means that the desired PCS signal strength must be at least 12 dB above the undesired POFS signal strength for interference free service. The adjacent channel interference criteria is dependant upon the number of MHz the PCS channel is removed from the POFS carrier frequency. For PCS channels immediately adjacent to a POFS channel (5.1 MHz removed from the POPS carrier frequency), the default interference criterion is 0 db. For PCS channels 5.3 MHz removed from the POFS carrier frequency, the default interference criterion is −10 dB. In this case, the RF engineer does not adjust the default criteria.

The default interference criteria to POFS stations from PCS facilities utilizes EIA Bulletin 10 (Electronic Industries Association, Engineering Department, EIA/TIA Telecommunications Systems Bulletin, "Interference Criteria for Microwave Systems in the Private Radio Services", TSB10-E, November 1990) definitions for interference, e.g., a 1 dB degradation to 30 dB signal to noise (S/N) for analog POFS links and a $10^{-6}$ to $10^{-5}$ bit error rate (BER) degradation for digital POFS links. In applying these criteria, the "standard" Bulletin 10 methodology enforces an interference level relative to threshold sensitivity without consideration of received signal levels or fade margins.

This standard methodology creates some anomalies which need to be corrected. For example, consider a 1 mile microwave path and a 10 mile microwave path with identical transmitting and receiving equipment. Under the "standard" methodology, the undesired PCS signal level necessary to cause interference is the same for both paths although the shorter path operates at a higher receive signal level, has a greater operating margin over the receiver threshold and therefore could tolerate a higher undesired PCS signal level than the longer path.

A number of possible modifications to the Bulletin 10 standards have been proposed and FCC Docket No. 92-9 provides a forum for industry comment on these proposals. In the preferred embodiment, the CUC 50 will provide the RF engineer with the industry accepted criteria for PCS-POFS interference with the possibility of utilizing alternate methods.

In this scenario, the RF engineer selects 202 the following method of calculating interference to POFS stations from PCS stations:

1. Analog microwave links require 16 dB above noise (thermal or interference) to maintain 30 dB S/N. Digital links require 26 dB above noise to maintain $10^{-6}$ BER.
2. Calculate the fade margin required for the microwave link as a function of path distance cubed, i.e., fade margin=30 log D where D is path length in miles.
3. Calculate the desired POFS unfaded receive signal strength, subtract 16 or 26 dB as appropriate, subtract the required fade margin. This yields the allowed undesired PCS signal level. In no case will the undesired PCS signal level be required to be less than 6 dB below thermal noise (kTB+NF), i.e., 99 dBm−6 dB=−105 dBm.

To evaluate intersystem interference under the selected criteria, the CUC 50 retrieves the operating parameters of the first POFS facility, WXX818, from the POFS database 90 and the parameters of WXX819, the other side of the point-to-point microwave path, step 204 in FIG. 11. These microwave station parameters are first utilized to calculate the desired unfaded receive signal level at WXX818 of the signal transmitted from WXX819 on 1935 MHz. This microwave channel, 1935 MHz, occupies a 10 MHz band from 1930 to 1940 MHz.

The calculation of the unfaded receive signal is made by taking the WXX819 transmitter power output, 25.0 dBm, subtracting the WXX819 transmission line loss, 6.0 dB, adding the WXX819 transmit antenna gain, 33.1 dBi, calculating and subtracting the free space path loss from WXX819 to WXX818, 120.2 dB, adding the WXX818 receive antenna gain, 33.1 dBi and subtracting the WXX818 transmission line loss, 2 dB. The unfaded receive signal is −37.0 dBm. The path length from WXX819 to WXX818 is 7.8 miles, therefore, the required fade margin is 26.8 dB. Since this is an analog path, the allowed undesired PCS signal level is −37.0−16−26.8=−79.8 dBm. The total interference power from all PCS cochannel and adjacent channel sources, therefore, must be less than −79.8 dBm.

The CUC 50 then retrieves the receiver selectivity performance specification from the WXX818 database entry. This performance specification tabulates how well the receiver rejects power from signals outside the 1930–1940 MHz band. In this example, the WXX818 receiver attenuates signals between 5 and 7 MHz removed from 1935 MHz by 6 dB, signals between 7 and 10 MHz removed from 1935 MHz by 15 dB and signals more than 10 MHz removed from 1935 MHz by at least 60 dB. This tabulation allows the CUC 50 to calculate signal levels from PCS channels adjacent to the 1930–1940 MHz band.

Since PCS subscriber units 36 for Licensee A operate in the 1850–1875 MHz band 106, they have no impact on WXX818 reception of 1935 MHz. Potential interference to WXX818 comes from PCS base station operation in the 1930–1955 MHz band 111. Therefore, the CUC 50 retrieves the undesired signal strengths for all other PCS base stations 32 from the WXX818 database entry. The CUC 50 also retrieves each PCS base station ACL. The CUC 50 sums the total received power from all other PCS base stations 32 that use frequencies cochannel and adjacent to 1955 MHz to determine how much power can be contributed by the Jeff Davis site 321 without exceeding the −79.8 dBm interference criteria, shown as 206 in FIG. 11. In this case, all other PCS base stations 32 using frequencies cochannel and adjacent channel to 1955 MHz have a combined signal level of −86.2 dBm.

At step 220 of FIG. 11, the CUC 50 then calculates the undesired signal strength from the Jeff Davis site 321 at the WXX818 receiver. The Jeff Davis effective radiated power (ERP) in the direction of WXX818 is calculated from the antenna, transmitter and transmission line information stored in the Jeff Davis database entry. The propagation loss between Jeff Davis and WXX818 is then determined from the selected Hata propagation model. The predicted Jeff Davis signal strength is then adjusted by the WXX818 receive antenna gain in the direction of Jeff Davis and the receive antenna polarization discrimination. This analysis yields the undesired received signal strength from Jeff Davis at WXX818. The undesired Jeff Davis signal strength value is stored in the WXX818 database entry 222.

If the undesired Jeff Davis received signal strength at WXX818 is greater than −79.8 dBm then all cochannel PCS base station transmit channels, channels one through fifty (1–50) for Licensee A, and all adjacent channels, channels fifty-one through seventy-five (51–75) for Licensee A, are removed from the ACL at step 224 of FIG. 11. Removing these PCS base station channels from the Jeff Davis ACL also removes the paired PCS subscriber unit frequencies from use in the Jeff Davis service area. In this example, the calculated undesired Jeff Davis signal level is −89.1 dBm.

The use of a single PCS channel in the 1930–1940 MHz band at Jeff Davis increases the total power received by WXX818 from all PCS interfering sources from −86.2 to −84.4 dBm. Adding the −89.1 dBm (1.2E-9 mW) signal to the −86.2 dBm (2.4E-9 mW) total power yields −84.4 dBm (3.6E-9 mW). The table of Appendix K provides details on the calculations of total interfering power. This total power is below the allowed −79.8 dBm limit. Similarly, the use of two PCS channels in the 1930–1940 MHz band at Jeff Davis increases the total interfering power to −83.1 dBm and is still below the −79.8 dBm limit. The CUC 50 determines that the use of six channels from the 1930–1940 MHz band at Jeff Davis increases the total interfering power at WXX818 to −80.1 dBm, and that adding the seventh channel pushes the total interfering power to −79.6 dBm and over the −79.8 dBm limit. Therefore, the CUC 50 provides the RF engineer the opportunity to specify which six channels from the 1930–1940 MHz band will remain in the Jeff Davis ACL. In this case the RF engineer selects channels one through six and the CUC 50 removes channels seven through fifty from the Jeff Davis ACL. The total interfering power at WXX818 increases to −80.1 dBm as a result of the use of these six channels at Jeff Davis. The selection of a re-use factor in the intrasystem analysis described below provides the RF engineer the opportunity to modify which channels from the 1930–1940, 1940–1942 and 1942–1945 MHz bands remain in the ACL.

The CUC 50 performs a similar process for analyzing PCS channels in the frequency bands adjacent to 1930–1940 MHz. Usually, the CUC 50 would examine frequencies above and below the microwave channel, however, in this case, frequencies below 1930 MHz are out of Licensee A's allocated frequency bands 111. PCS channels in the 1940–1942 MHz band are 5 to 7 MHz removed from the center of microwave channel. Therefore, the CUC 50 reduces the undesired Jeff Davis signal strength by the receiver selectivity: −89.1 dBm−6 dB=−95.1. There are ten PCS channels in the 1940–1942 MHz band, channels fifty-one through sixty (51–60). Utilizing one channel in the 1940–1942 MHz band at Jeff Davis would increase the total interfering power at WXX818 from −80.1 dBm to −80.0 dBm, adding a second channel increases the total interfering power exactly to the −79.8 dBm limit. Therefore, two channels from the 1940–1942 MHz band can be utilized at Jeff Davis, however, the use of two channels from this band would preclude the use of any channels from the 1942–1945 MHz band at Jeff Davis. Therefore, although the CUC 50 provides the RF engineer the opportunity to select two channels from the 1940–1942 MHz band, the RP engineer selects a only single channel, channel fifty-one (51), from this band. The CUC 50 removes channels fifty-two (52) through sixty (60) from the Jeff Davis ACL. The total interfering power at WXX818 increases to −80.0 dBm as a result of the use of this channel at Jeff Davis.

Finally, the CUC 50 performs a similar process for analyzing PCS channels in the 1942–1945 MHz band. PCS channels in the 1942–1945 MHz band are 7 to 10 MHz removed from the center of microwave channel. Therefore, the CUC 50 reduces the undesired Jeff Davis signal strength by the receiver selectivity: −89.1 dBm−15 dB=−104.1. There are fifteen PCS channels in the 1942–1945 MHz band, channels sixty-one through seventy-five (61–75). The CUC 50 determines that the use of twelve channels from this band at Jeff Davis increases the total interfering power at WXX818 right to the allowed −79.8 dBm limit. The thirteenth channel from this band would push the total power over the allowed limit. Therefore, the CUC 50 provides the RP engineer the opportunity to select twelve channels from the 1942–1945 MHz band. In this case, the RF engineer selects channels sixty-one through seventy-two and the CUC 50 removes channels 73, 74 and 75 from the Jeff Davis ACL. The total interfering power at WXX818 increases to the −79.8 dBm limit as a result of the use of these channels at the Jeff Davis base station 321.

The CUC 50 then calculates potential interference to Jeff Davis from WXX818's transmit frequency, 1855 MHz. WXX818 transmissions on 1855 MHz cannot interfere with PCS subscriber unit receive frequencies (1930–1955 MHz) 111 and therefore, the potential interference evaluation is limited to a calculation at the Jeff Davis base station 321. The CUC 50 calculates an undesired WXX818 signal level at the Jeff Davis base station 321 (as shown as step 226 in FIG. 11) using the WXX818 transmitter power output, antenna gain, antenna radiation pattern and Hata propagation loss. This calculated value is stored in the Jeff Davis database entry 228.

The undesired WXX818 signal strength is then compared to the selected service threshold 230. If the undesired WXX818 signal does not meet the selected 12 dB C/I ratio, then PCS channels one through fifty (1–50) are removed from the Jeff Davis ACL. If the undesired WXX818 signal does not meet the selected 0 dB C/I ratio, then PCS channel fifty-one (51) is removed from the Jeff Davis ACL. If the undesired WXX818 signal does not meet the selected −10 dB C/I ratio, then PCS channel fifty-two (52) is removed from the Jeff Davis ACL. In this example, the undesired WXX818 signal strength is −110.2 dBm and is more than 12 dB below the selected −96 dBm threshold. Therefore, WXX818 transmission on 1855 MHz has no effect on the Jeff Davis ACL.

An undesired WXX818 signal level is also calculated at each Jeff Davis grid point 130 even though WXX818 transmissions on 1855 MHz cannot interfere with PCS subscriber unit receive frequencies (1930–1955 MHz), as shown as 232 in FIG. 11. These calculations are made at each grid point 130 for later comparison to CUV measured values in the MDA evaluation described below. The "expected" undesired WXX818 signal level at each grid point is stored in the Jeff Davis database entry 234.

When the CUC 50 completes its analysis of potential interference to and from WXX818 it then retrieves the next POFS microwave station, WXX819, as step 204 in FIG. 11, for intersystem interference evaluation 127.

The desired unfaded receive signal level at WXX819 of the signal transmitted from WXX818 on 1855 MHz is calculated exactly as described above for WXX818. This microwave channel, 1855 MHz, occupies a 10 MHz band from 1850 to 1860 MHz. Since PCS base stations for Licensee A operate in the 1930–1955 MHz band, they have no impact on WXX819 reception of 1855 MHz. As shown in step 208 in FIG. 11, potential interference to WXX819 comes from PCS subscriber unit operation in the 1850–1875 MHz band 106. In this case the desired unfaded receive signal level at WXX819 is −36.6 dBm and the total allowed interfering power is: −36.6−16−26.8=−79.4 dBm 210.

For a GSM type PCS architecture with 8 voice channels per carrier, as many as eight subscriber units at a given grid point could utilize the same frequency. Since each unit would operate in a distinct time slot, however, the potential interference from these units should not be additive. For a Qualcomm CDMA type PCS architecture, as many as 40 or more subscriber units could utilize the same frequency at the same location at the same time. For this type of architecture, the CUC 50 would include the additive effect of multiple subscriber units 36 at each grid point 130 in the interference analyses.

To determine how much power can be contributed by subscriber units 36 in the Jeff Davis service area without exceeding the total allowed interfering power at WXX819, the CUC 50 retrieves from the WXX819 database entry, the undesired signal strengths from the "worst case" grid point of all other PCS base stations 32. The CUC 50 also retrieves the ACL for each PCS base station 32. The CUC 50 then sums the total received power from PCS subscriber units 36 at the worst case grid points of all PCS base stations that use frequencies cochannel and adjacent channel to 1855 MHz. In this case, the total received interfering power level is −99.3 dBm.

The CUC 50 then calculates the undesired signal strength at the WXX819 receiver from a subscriber unit 36 at each Jeff Davis grid point 210. The undesired signal level is calculated from the subscriber unit ERP and the Hata propagation loss and is adjusted by the WXX819 receive antenna gain in the direction of the Jeff Davis grid point and the receive antenna polarization discrimination. This analysis yields the undesired received signal strength at WXX819 from a subscriber unit at each Jeff Davis grid point. The highest undesired received signal strength, i.e., the undesired signal from the "worst case" grid point, is stored in the WXX819 database entry 212. In this example, the worst case Jeff Davis grid point (row 3, column 4) produces an undesired signal level of −102.6 dBm at WXX819.

Grid points 130 that do not receive a desired signal from the Jeff Davis base station 321 above the selected service threshold (−96 dBm), are not included in the interference analyses. The rationale for this exclusion is as follows: if a subscriber unit 36 cannot receive service from a base station 32 at a given grid point 130, it cannot operate on a frequency assigned by that base station 32 and therefore, cannot be a source of potential interference to a POFS station (or other PCS base station). Furthermore, if the desired signal at a given grid point 130 is insufficient to provide service, the signal level from an undesired source is not important.

The CUC 50 then performs an analysis of channels in the 1850–1860, 1860–1862 and 1862–1865 MHz bands that can be used at the worst case Jeff Davis grid point without increasing the total interfering power, −99.3 dBm, over the allowed −79.4 dBm limit. This analysis is virtually identical to the process described above for the 1930–1940, 1940–1942 and 1942–1945 MHz bands. Because the PCS system and the POFS stations utilize an 80 MHz transmit-receive separation, the limits on frequency use at Jeff Davis imposed by protection requirements to WXX818, have reduced the potential channels in the 1850–1860 MHz band to six, the potential channels in the 1860–1862 MHz band to one and the potential channels in the 1862–1865 MHz band to twelve. In this case, the use of all of these channels at the worst case Jeff Davis grid point (row 3, column 4) does not increase the total interfering power at WXX819 above the −79.4 dBm limit.

The CUC 50 then calculates potential interference to Jeff Davis from WXX819's transmit frequency, 1935 MHz, as shown in step 236 of FIG. 11. WXX819 transmissions on 1935 MHz cannot interfere with PCS base station receive frequencies (1850–1875 MHz) and therefore, the potential interference evaluation is performed at each Jeff Davis grid point. The CUC 50 calculates an undesired WXX819 signal level at each Jeff Davis grid point 130 using the WXX819 transmitter power output, antenna gain, antenna radiation pattern and Hata propagation loss. These calculated values are stored in the Jeff Davis database entry 240.

As shown in step 244 of FIG. 11, at each grid point 130, the undesired WXX819 signal level is compared to the desired Jeff Davis signal level calculated above in the Theoretical Propagation Analysis 124, Coverage 126 analysis. If the WXX819 signal strength is too high at a critical grid point 137 receiving a desired signal above the selected service threshold, the appropriate PCS channels are removed from the ACL. If that grid point is not designated as critical, the predicted interference is reported but the channel is not removed from the ACL. In this example, at grid point (row 5, column 6) the desired Jeff Davis signal strength is −89.4 dBm and the undesired WXX819 value is −104.3 dBm. At this critical grid point 137 the 12 dB C/I cochannel ratio and both adjacent channel ratios are met.

As shown in step 248 of FIG. 11, an undesired WXX819 signal level is also calculated at the Jeff Davis base station even though WXX819 transmissions on 1935 MHz cannot interfere with PCS base station receive frequencies (1850–1875 MHz) 106. This calculations is made for later comparison to CUV measured values in the MDA evaluation described below. The "expected" undesired WXX819 signal level at the Jeff Davis base station 321 is stored in the Jeff Davis database entry 252.

The intersystem interference analysis is completed when all POFS stations in the database 92 have been evaluated, as shown in step 256 of FIG. 11. As shown as step 260 in FIG. 11, the completed ACL is stored in the PCS base station database 92. The CUC 50 then provides the RF engineer with detailed reports and graphic displays of the intersystem interference analysis.

After completing the intersystem interference analysis, the RF engineer selects the Theoretical Propagation Analyses 124, Intrasystem Evaluation 128 from the main menu 122 of the CUC 50. A flow chart for the intrasystem interference analysis is provided as FIG. 12.

The CUC 50 allows the RF engineer to apply a frequency re-use factor to the ACL for the Jeff Davis site 280. If a hexagonal grid 300, consisting of hexagonal cells 303, is used as the basis for base station 32 site locations, a frequency re-use factor can be employed to fix cochannel frequency re-use within the system to regular geographic separations. The re-use factor can be determined from the following relationship as described in V. H. MacDonald, "The Cellular Concept", The Bell System Technical Journal, January 1979, Vol. 58, No. 1.:

$$N=i+ij+j$$

where i,j are integers and i>=j
A frequency re-use plan helps control intrasystem interference and is used in the cellular industry. Because of the low antenna heights and the discrete base station 32 coverage areas of a PCS system, it is believed that fixed frequency re-use plans will be too inflexible for a mature PCS system. However, in the preferred embodiment, the CUC 50 provides the capability of utilizing a frequency re-use factor.

Figure 13:
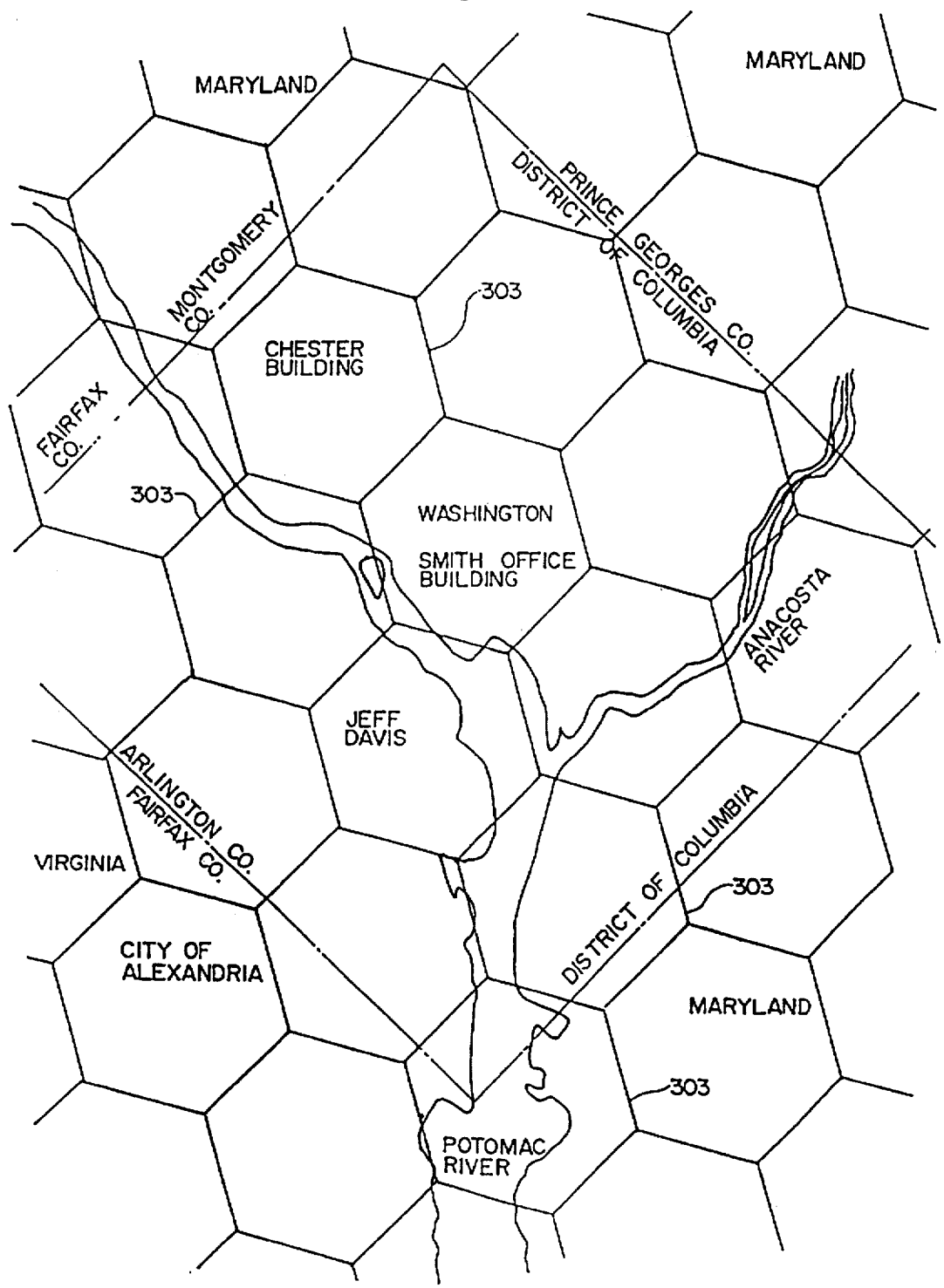
FIG. 13 is a map showing the PCS base station sites and the theoretical hexagonal grid.
Figure 14:
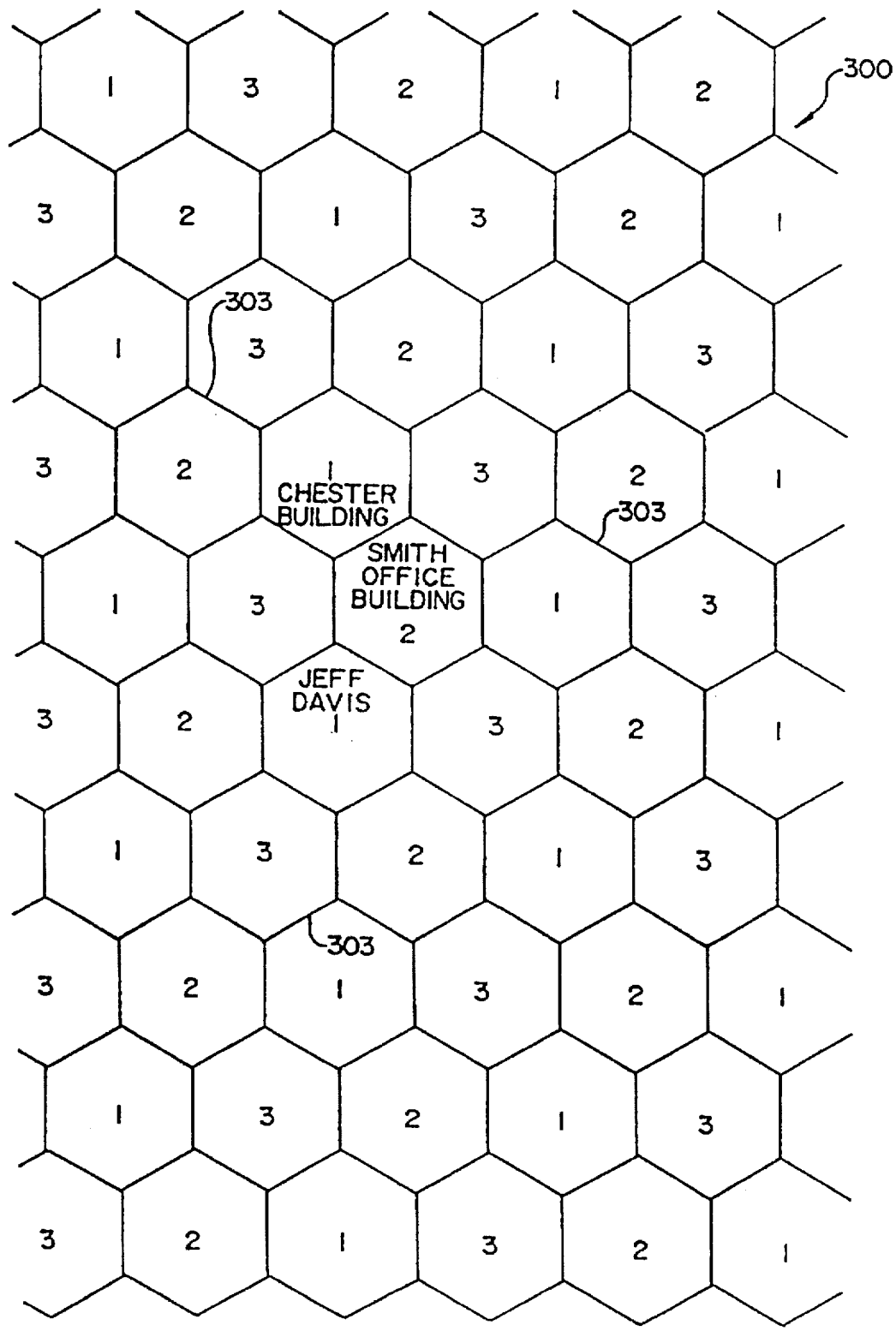
FIG. 14 is a diagram showing channel group assignments to base station locations.

For the GSM type PCS system described herein, the RF engineer utilizes an N=3 frequency re-use factor (i=1, j=1) in the channel availability determination. The PCS sites fall on a theoretical grid 300 based upon a base station service radius of 1.67 miles. A map of the PCS base station sites and the theoretical grid 300 is included as FIG. 13. An N=3 reuse plan divides the PCS channels into three groups. The channel groups, 1, 2 and 3, are assigned to base stations on the theoretical grid 300 on a one-up (i=1) and one-over (j=1) pattern as depicted on FIG. 14. The RF engineer also uses a three sector system, i.e., three 120° antennas are utilized instead of an omnidirectional antenna, at some sites to decrease intrasystem cochannel interference. The three sector system divides each of the three channel groups into three sub-groups as shown on the table in Appendix L.

Using the N=3 re-use pattern, the RF engineer selects the appropriate channel group for the Jeff Davis site 132, i.e., Group 1. Since the RF engineer has selected an omnidirectional antenna for the Jeff Davis site 132, i.e., it is not a sectorized site, the ACL can include channels from Groups 1A, 1B and 1C. However, as a result of the intersystem interference analysis, the ACL is limited to six channels from the 1930–1940 MHz band, one channel from the 1940–1942 MHz band and twelve channels from the 1942–1945 MHz band.

The CUC 50 then provides an opportunity for the RF engineer to modify the selected channels in the ACL to conform to the channel re-use plan he has selected. In order to comply with the interference protection requirements, the RF engineer selects the following channels from the 1930–1940 MHz band:

From Group 1A: 1, 10, 19, 28, 37, 46

From Group 1B: none

From Group 1C: none and the following channels from the 1940–1942 MHz band:

From Group 1A: 55

From Group 1B: none

From Group 1C: none and the following channels from the 1942–1945 MHz band:

From Group 1A: 64, 73

From Group 1B: 67

From Group 1C: 61, 70

In addition the following channels are not precluded by the intersystem interference analysis, are compatible with the selected re-use plan and therefore are included in the ACL:

From Group 1A: 82, 91, 100, 109, 118

From Group 1B: 76, 85, 94, 103, 112, 121

From Group 1C: 79, 88, 97, 106, 115, 124

The RF engineer then selects the base stations 32 to be included in the intrasystem interference analysis. The RF engineer can select these base stations 32 in a variety of ways: individually from a master list, within a fixed distance, cochannel sites or adjacent channel sites. In this case, the RF engineer only includes the two base stations 32 shown in the table in Appendix H in the interference analysis. The intrasystem interference analysis is performed by calculating the signal level of each base station 32 included in the study at each Jeff Davis grid point 130. Additionally, the intrasystem interference analysis calculates the signal level from the Jeff Davis base station 321 to the grid points 130 of each of the other base stations 32 included in the study.

The RF engineer then selects the propagation model to be used in the interference analysis 284. In this case, the RF engineer selects the Hata propagation model.

Finally, the RF engineer can adjust the interference criteria used in the analysis 288. In this case, the RF engineer selects a cochannel interference criterion of 12 dB. The RF engineer selects an adjacent channel interference criterion of −10 dB.

Figure 12:
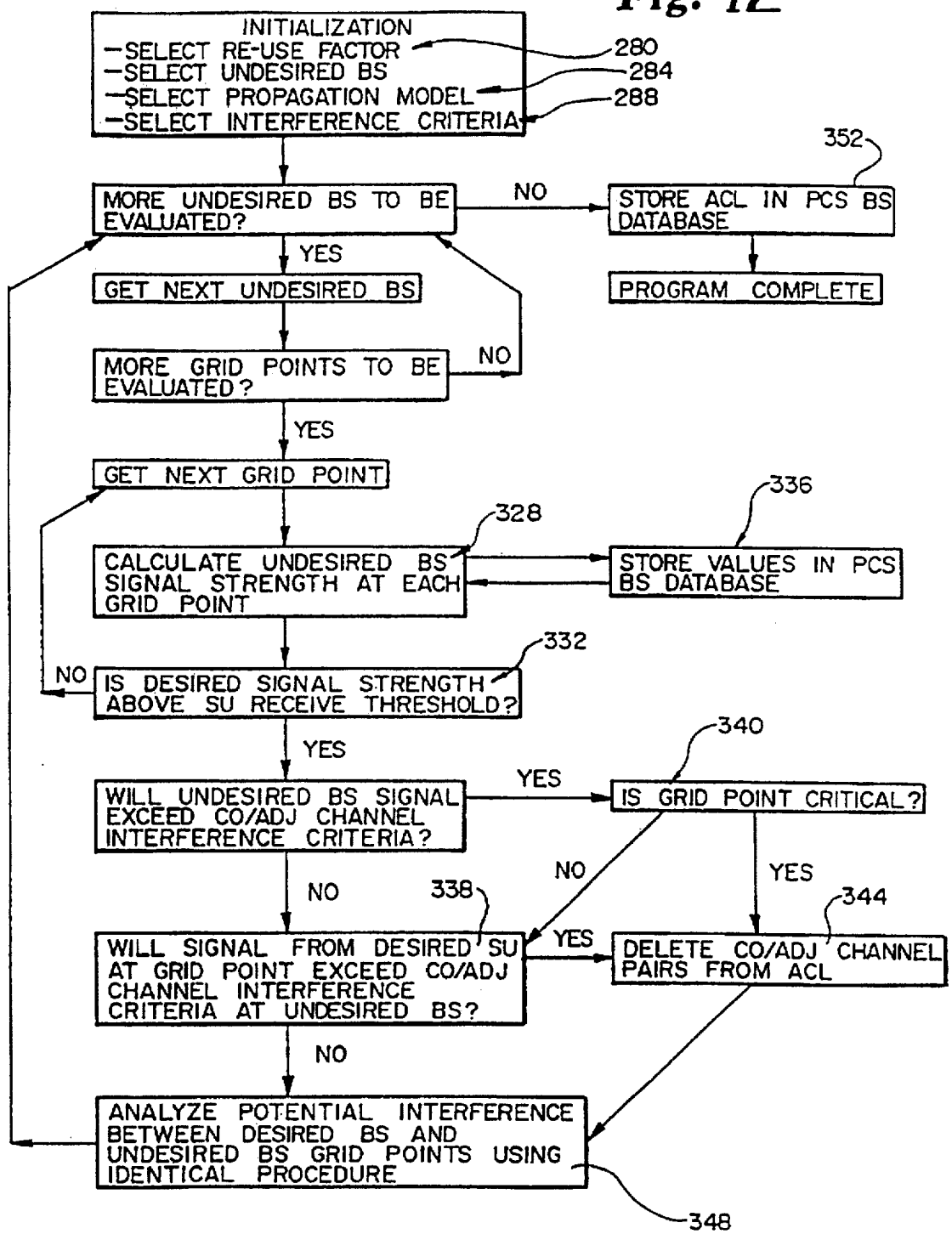
FIG. 12 is a flow chart used by the CUC for performing the theoretical intrasystem interference analysis.

To evaluate potential intrasystem interference, the CUC 50 calculates the predicted signal strength from the first selected base station, Chester Building 322, to each of the Jeff Davis grid points using the selected propagation model in step 324 of FIG. 12. The CUC retrieves the operating parameters of the Chester Building base station 322, retrieves the coordinates of the first grid point 130, verifies that the calculated desired signal strength is above the service threshold 332 and checks to see if the grid point 130 is a critical point 137. The effective radiated power (ERP) from Chester Building 322 to the first grid point 130 is calculated from the antenna radiation pattern, antenna orientation, transmitter power and transmission line loss. Since the Chester Building site is a sectored site, the CUC calculates the ERP from each sector to the grid point 130. The propagation loss between Chester Building 322 and the grid point 130 is then determined from the selected propagation model. The undesired signal strengths from the Chester Building sectors are determined from the ERPs and the propagation loss. The calculated undesired signal strengths are stored in the Jeff Davis database entry 336.

The calculated undesired signal from each Chester Building sector is compared to the desired signal strength from the Jeff Davis site calculated in the coverage analysis described above. If the desired to undesired signal strength ratio does not meet the cochannel interference criteria at a critical grid point 137, the CUC 50 removes the channels from the ACL that are cochannel with the channels in the specific Chester Building sector, as shown as step 344 in FIG. 12. For example, the calculated desired signal strength at grid point 130 (row 5, column 6) is −89.4 dBm and the calculated undesired signal strength from Chester Building Sector 2 (antenna orientation=165°) is −94.3, the C/I ratio at this grid point 130 is only 4.9 and does not meet the specified 12 dB criterion. Since grid point (row 5, column 6) is a critical point 137, all channels in the Jeff Davis ACL that are cochannel with the channels in Chester Building Sector 2 are removed from the ACL. In this case Group 1B channels; 67, 76, 85 and 94 are removed from the Jeff Davis ACL.

Similarly, if the desired to undesired signal strength ratio does not meet the adjacent channel interference criteria at a critical grid point 137, the CUC 50 removes the channels from the ACL that are adjacent to the channels in the specific Chester Building sector 344. In this case, the adjacent channel interference criterion is met at every Jeff Davis grid point 130.

The CUC 50 also calculates the received signal strength at the Chester Building site 322 from a subscriber unit 36 at the Jeff Davis grid point 130. The undesired subscriber unit signal level is calculated from the subscriber unit ERP and the Hata propagation loss and is adjusted by the Chester Building receive antenna gain in the direction of the Jeff Davis grid point 130. To apply the cochannel and adjacent channel interference criteria, the CUC 50 utilizes the selected service threshold, −96 dBm, as the desired signal level at the Chester Building base station 322 and compares this value to the undesired Jeff Davis subscriber unit 36 signal strength. If the undesired subscriber unit 36 signal level is not at least 12 dB below the service threshold, the CUC 50 removes cochannel frequencies from the ACL. Similarly, if the adjusted undesired subscriber unit 36 signal level is more than 10 dB above the service threshold, the CUC 50 removes adjacent channel frequencies from the ACL. In this case, the cochannel and adjacent channel interference criteria are met at the Chester Building base station 322 from every Jeff Davis grid point 130.

The CUC 50 then performs an analysis of potential interference between the Jeff Davis base station 321 and each Chester Building grid point 130, as shown in step 348 of FIG. 12. This analysis is identical to the analysis described above for interference between the Chester Building base station 321 and the Jeff Davis grid points 130. The expected undesired Jeff Davis signal strengths at each Chester Building grid point 130 are stored in the Chester Building database entry. In this case, no further adjustments to the Jeff Davis ACL are necessary.

After completing the evaluation of the Chester Building site 322, the CUC 50 retrieves the parameters of the Smith Office Building site 323 and performs the same potential interference analysis as described above. The Jeff Davis site 321 does not have any frequencies that are cochannel to nor adjacent channel to any frequencies at the Smith Office Building site 323. Nevertheless, the CUC 50 calculates the signal levels from the Smith Office Building site 323 to each Jeff Davis grid point 130 and from the Jeff Davis site 321 to each Smith Office Building grid point 130. These calculations are made and stored in the respective database entries, as shown in step 352 in FIG. 12, for later comparison to CUV measured values in the MDA evaluation described below.

The CUC 50 then provides the RF engineer with detailed reports and graphic displays of the intrasystem interference analysis.

After completing the theoretical analysis of the Jeff Davis site 321, the RF engineer utilizes the Test Mobile Unit (TMU) 68 to obtain measurement data which is used to verify coverage and interference predictions. In the preferred embodiment, the TMU 68 is a portable device which allows a field technician to traverse the intended service area of the Jeff Davis base station 321 and collect measured signal strength readings on POFS channels and PCS control channels. This data is collected by the TMU 68 by performing the CUV procedure.

The TMU 68 also associates a coordinate location with each set of CUV measurements. This can best be accomplished by including a GPS receiver in the TMU 68. Alternatively, the position of the TMU 68 can be supplied manually or the CUC 50 can triangulate the position by examining the relative signal strengths of the measured PCS base station 32 control channels.

The CUV procedure involves tuning a receiver to each POFS microwave channel, in turn, measuring the received power in that channel and retaining the measured data for uploading to the CUC 50. The CUV procedure also involves measuring the received power in each PCS control channel (base station 32 transmit). This information is similarly retained for uploading to the CUC 50. The Test Mobile Unit 68 can also upload the measured data real-time to the CUC 50 by accessing a voice channel from the PCS base station 32 and dialing directly into the CUC 50. Alternatively, the Test Mobile Unit 68 can store the measured data on a floppy disk, or other medium, for later uploading to the CUC 50.

In the preferred embodiment, the TMU 68 allows the field technician to select which POFS and PCS channels are included in the CUV. Licensee A does not require information on microwave paths that do not utilize transmit or receive frequencies in the 1850–1875 MHz or 1930–1955 MHz bands. Therefore, the TMU 68 can be programmed to measure only certain preset POFS channels. Similarly, the TMU 68 only needs to measure PCS channels that are used as control channels. The RF engineer may not want measured data on voice channels that might not be active at the time the measurements are taken. Therefore, the PCS channels measured by the TMU 68 can also be programmed.

When the CUC 50 receives the CUV measured data, the RF engineer can perform the measured data analysis (MDA). The CUC 50 compares, POFS channel by POFS channel, the values measured by the TMU 68 against the expected values stored in the Jeff Davis database entry. This process protects POFS stations against interference from PCS subscriber unit 36 transmit frequencies and protects against receiving interference at PCS subscriber units 36 on PCS base station 32 transmit frequencies (PCS subscriber unit 36 receive frequencies). The CUC 50 also compares, PCS control channel by PCS control channel, the values measured by the TMU 68 against the expected values stored in the Jeff Davis database entry. This process protects other PCS base stations 32 against interference from PCS subscriber units 36 in the Jeff Davis service area and protects against PCS subscriber units 36 in the Jeff Davis service area receiving interference from other PCS base stations 32.

The CUC 50 provides the RF engineer the opportunity to select the desired tolerance between expected values and CUV measured values. This tolerance is used by the CUC 50 to identify measured values that are more than the selected tolerance above or below the expected values. In this case, the RF engineer selects a tolerance of 6 dB.

In evaluating the measured data from the TMU 68, the CUC 50 retrieves the first set of CUV measurements and utilizes the associated coordinates to determine the closest grid point 130. The measured TMU 68 data is then compared with theoretical values stored in the Jeff Davis database entry for that grid point 130.

For each POFS channel, the CUC 50 retrieves the expected value for all cochannel POFS stations and selects the POPS station with the highest expected value. Because of the relatively large geographic separation of cochannel re-use by POFS stations and because of the highly directional nature of POFS transmissions, in the vast majority of cases, a single POFS station will have an expected signal strength far exceeding all other cochannel stations. In cases where the POFS station with the second highest expected value is within the selected tolerance of the station with the highest expected value, the CUC 50 reports the stations and the expected values to the RF engineer. In these cases, if measured values for each POFS station is critical, the field technician can replace the TMU's 68 omnidirectional antenna 70 with a highly directional antenna 71 and design a CUV measurement procedure that allows separate measurements to be taken on each POFS station.

At each grid point 130, the CUC 50 then compares the expected value of the POFS station, to the measured value obtained in the TMU 68 CUV procedure. If the measured value is within the selected tolerance of the expected value, the CUC 50 does not modify the ACL. If, however, the measured value is more than the selected tolerance higher than the expected value, which might occur, for example, where a line-of-sight condition exists between the PCS base station 32 and the POFS station and a Hata propagation prediction method was used for the theoretical analysis, the CUC 50 compares the measured value to the desired Jeff Davis signal strength at that grid point 130. If the measured POFS value degrades the C/I ratio below the selected cochannel interference criterion, and the grid point is designated as critical 137, the CUC 50 removes all cochannel frequencies from the Jeff Davis ACL. Adjacent channels are similarly removed from the Jeff Davis ACL if the measured POFS value degrades the C/I ratio below the selected adjacent channel interference criterion.

In this example, the desired Jeff Davis signal strength at critical grid point 137 (row 5, column 6) is −89.4 dBm and the undesired WXX819 (1935 MHz) value is −104.3 dBm. In this example, the CUV measured value for this grid point is −98.1 dBm. In this case, the selected 6 dB tolerance is not met nor is the 12 dB cochannel C/I ratio met. Since the MDA has determined that the use of frequencies cochannel to WXX819 at Jeff Davis would result in received interference at a critical grid point 137, the CUC 50 removes channels 1, 10, 19, 28, 37 and 46 from the Jeff Davis ACL. In this case, both the 0 dB and the −10 dB adjacent channel interference criteria are met.

The measured CUV values at each grid point 130 are stored in the Jeff Davis database entry.

The CUC 50 also examines the paired POFS frequency to see if the PCS system might be causing interference to the POFS receive channel. The advantage of the FAST system 30 is that by measuring the power in the POFS transmitted channel, it can determine if the PCS system might interfere with the paired POFS channel received at that location. This is done by calculating the actual propagation loss between the PCS base station 32 and the POFS receiver based on the measured power of the POFS signal. Based upon this actual propagation loss the CUC 50 adjusts the subscriber unit 36 undesired power at the POFS station. In this case, the measured propagation loss between WXX819 and grid point 130 (row 5, column 6) is 6.2 dB less than predicted. Therefore, the CUC 50 calculates the expected signal strength at WXX819 from a subscriber unit 36 at this grid point 130 and adjusts the Hata propagation loss by 6.2 dB. In this example, the adjusted signal strength from grid point 130 (row 5, column 6) is −103.5 dBm and is below the −102.6 dBm signal from the worst case Jeff Davis grid point 137 (row 3, column 4). This calculation is made even if the Jeff Davis ACL does not contain any frequencies cochannel or adjacent channel to WXX819 so that the "worst case" grid point 137 data can be updated if necessary. In this case, no further adjustments to the Jeff Davis ACL or the worst case data is required as a result of this CUV measurement.

If the measured POFS signal strength is more than the selected tolerance below the expected value, the CUC 50 determines if channels could be added to the ACL without causing interference nor receiving interference from the POFS base station. This might occur, for example, when a significant obstruction blocks the direct path from the PCS base station 32 to the POFS station. The CUC 50 reports possible channel additions to the system operator for further verification prior to adding the channels to the ACL.

After the interference analyses have been completed, the RF engineer examines the ACL to see if sufficient interference-free channels are available to meet the projected demand. If insufficient channels are available at the new site with the selected parameters, the RF engineer would examine the PCS and POFS facilities that block channel use at the new site and revisit the base station 32 parameter selection. For example, changing from an omni-directional antenna 70 to a directional antenna 71, a power or height reduction or site move might remove potential interference between the proposed facility and other PCS base stations 32 or POFS facilities, freeing up additional PCS channels at the new site. If necessary, the RF engineer might decide that a POFS facility needs to be relocated in frequency and negotiations with the POFS licensee would commence.

In this case, after the interference analyses, the ACL contains the following channels:

From Group 1A: 55, 64, 73, 82, 91, 100, 109, 118
From Group 1B: 103, 112, 121
From Group 1C: 61, 70, 79, 88, 97, 106, 115, 124 which is sufficient to meet the projected demand at the new site.

At this point the site design phase is completed and the RF engineer prints out the parameters of the proposed base station 32 for the site acquisition personnel. Once the Jeff Davis site has been acquired and the installation process has been completed, the base station 32 is ready to go into operation. When the base station 32 is powered on, it performs the CUV and uploads to the CUC 50, the received power in each POFS microwave channel. When the CUC 50 receives the CUV measured data, the RF engineer can perform the MDA. Whereas the TMU 68 CUV measured data protected against interference between PCS subscriber units 36 and POFS stations, the base station CUV measured data protects against interference between PCS base stations 32 and POFS stations.

In performing the MDA, the CUC 50 compares, POFS channel by POFS channel, the measured values against the expected values stored in the Jeff Davis database entry. This procedure protects POFS stations against interference from Jeff Davis transmit frequencies and protects against receiving interference at Jeff Davis on PCS subscriber unit transmit frequencies (PCS base station receive frequencies). The MDA process for base station CUV data is very similar to the MDA process described above for TMU CUV data. The base station MDA process is somewhat simpler, however, in that interference evaluations are made at PCS base stations 32 and POPS stations, and do not need to be made at each grid point 130.

In the preferred environment, the PCS base station CUV procedure can optionally include measured data on each PCS control channel (base station transmit). In an FDD system, this information does not directly relate to any interference condition; i.e., base station transmit frequencies cannot interfere with base station transmit frequencies. This data can be used, however, to draw general conclusions about potential intra-system interference, particularly for PCS base stations 32 with low antenna heights. If a measured value far exceeds an expected value, it is likely that subscriber units 36 served by the base station 32 will receive interference from and/or cause interference to the undesired base station 32. Measured values far below the expected values indicate the presence of severe path obstructions. Therefore, this data can also be helpful in determining the existence of line-of-sight paths for microwave interconnects.

When all the interference analyses have been completed and the measured data evaluated, only interference-free channels remain in the ACL. The CUC 50 sends the ACL to the new base station 32 which is now ready to begin operation on the channels included in the ACL. The FAST system 30 provides one additional feature in the call set-up procedure to minimize intersystem and intrasystem interference.

In the preferred embodiment of a PCS system, each PCS base station 32 transmits certain overhead information on its control channel. Included in this information is a base station 32 identification and the base station's 32 ACL. Alternatively, to cut down on system overhead, the ACL transmitted on the control channel could be limited to available voice channels, i.e. ACL voice channels not currently in use at the base station. When a subscriber places or receives a call, the subscriber unit 36 and the PCS base station 32 enter the call set-up procedure. Included in this procedure is the Channel Selection Process (CSP) 350 which provides an additional measure of protection against intrasystem and intersystem interference.

When a subscriber places or receives a call, the subscriber unit 36 first measures the power on every channel in the ACL (base station transmit, subscriber unit receive). The subscriber unit 36 then transmits to the base station 32 on the control channel (base station receive side of channel pair), a request for a voice channel. Also transmitted to the base station 32 are the measurements taken by the subscriber unit 36 on each of the channels in the ACL.

In the preferred embodiment, PCS base stations 32 continually (e.g., every second) measure signal strengths on every voice channel in the ACL (base station 32 receive, subscriber unit 36 transmit). The voice channels in the ACL are then ranked by ascending signal strength. Therefore, the channel ranked number 1 currently has the least amount of measurable power in the channel. When the base station 32 receives the subscriber unit's 36 measured data, it ranks the subscriber unit's 36 channels according to the same criteria. For each channel, the base station 32 adds the subscriber unit rank to the base station rank and selects the channel with the lowest total rank. This is the channel selected for this particular call. The base station 32 then sends a message to the subscriber unit 36 on the control channel, to utilize the selected channel for this call.

This CSP process minimizes intrasystem and intersystem interference by selecting the best available channel at the moment every call is initiated. Other mechanisms, such as continual monitoring of the C/I ratio by both base station 32 and subscriber unit 36, are utilized by the PCS system to insure high quality communications throughout the duration of the call.

Using the foregoing embodiments, methods and processes, the FAST system 30 allows PCS systems to maximize system capacity and minimize interference, thereby maximizing efficient use of scarce radio spectrum, by making channel assignments subject to noninterference between intersystem and intrasystem users. It will be clear to those in the art that many and varied modifications can be made to the preferred embodiment shown and described such as noninterference based systems adapted to other network architectures, multiple access schemes, and other known advances in PCS technology. All such variations and modifications are intended to be within the scope of the appended claims.

Appendix A
COMMAND AND RESPONSE FORMATS

| COMMAND | DESCRIPTION |
|---|---|
| Attention | Place microcontroller in active state |
| Reset | Reboot microcontroller |
| Measure Data | Command microcontroller to perform measurements described in Band Table |
| Terminate Scan | Terminate Execution of the Current Measure Data Command |
| Band Table Clear | Clear all entries in Band Table |
| Band Table Append | Add an entry to Band Table |
| Band Table Remove Entry | Remove an entry from Band Table |
| Band Table Get First Entry | Read first entry in Band Table |
| Band Table Get Next Entry | Read entry in Band Table immediately following the last entry read |
| Upload Data | Transfer measured data from volatile memory to calling computer |
| Upload Log | Upload the Microcontroller Command Log |
| Download | Replace EEPROM microcode with new code |
| Set Clock | Set microcontroller real-time clock |
| Get Clock | Read real-time clock value |
| Run Diagnostics | Perform microwave receiver and microcontroller self-test |
| Get Hardware Configuration | Report RMU unit ID, microcode version, number of RF inputs |

Appendix A
COMMAND AND RESPONSE FORMATS

| COMMAND | DESCRIPTION |
|---|---|
| Get Operational Configuration | Rep base station ID, RMU telephone number, primary CUC telephone number, back-up CUC telephone number |
| Set Operational Configuration | Set base station ID, RMU telephone number, primary CUC telephone number, back-up CUC telephone number |
| Get Operational Status | Report completion time of last data measurement, current measurement status, available volatile memory |

APPENDIX B
Sample 25 KHz Raw Data

| BAC03D | 1 |
|---|---|
| 1850 | −125.28 |
| 1850.025 | −124.28 |
| 1850.05 | −122.48 |
| 1850.075 | −124.61 |
| 1850.1 | −124.45 |
| 1850.125 | −124.89 |
| 1850.15 | −124.7 |
| 1850.175 | −122.8 |
| 1850.2 | −121.85 |
| 1850.224 | −125.07 |
| 1850.249 | −124.38 |
| 1850.274 | −124.33 |
| 1850.299 | −122.8 |
| 1850.324 | −124.38 |
| 1850.349 | −124.61 |
| 1850.374 | −124.38 |
| 1850.399 | −124.52 |
| 1850.424 | −125.03 |
| 1850.449 | −125.19 |
| 1850.474 | −124.61 |
| 1850.499 | −123.82 |
| 1850.524 | −124.66 |
| 1850.549 | −124.45 |
| 1850.574 | −125.38 |
| 1850.599 | −124.68 |
| 1850.623 | −125.03 |
| 1850.648 | −124.7 |
| 1850.673 | −124.89 |
| 1850.698 | −124.31 |
| 1850.723 | −123.86 |
| 1850.748 | −124.66 |
| 1850.773 | −125.12 |
| 1850.798 | −124.7 |
| 1850.823 | −124.38 |
| 1850.848 | −124.03 |
| 1850.873 | −123.86 |
| 1850.898 | −124.35 |
| 1850.923 | −124.96 |
| 1850.948 | −124.26 |
| 1850.973 | −124.56 |
| 1850.998 | −124.89 |
| 1851.022 | −125.05 |
| 1851.047 | −125.14 |
| 1851.072 | −125.24 |
| 1851.097 | −124.19 |
| 1851.122 | −124.33 |
| 1851.147 | −124.45 |

APPENDIX C
Sample 200 KHz Processed Data

| BAC03D | 1 |
|---|---|
| 1850 | −122.48 |
| 1850.2 | −121.85 |
| 1850.4 | −122.76 |
| 1850.6 | −122.76 |
| 1850.8 | −122.76 |
| 1851 | −122.76 |
| 1851.2 | −122.76 |
| 1851.4 | −122.76 |
| 1851.6 | −122.76 |
| 1851.8 | −122.76 |
| 1852 | −122.48 |
| 1852.2 | −122.48 |
| 1852.4 | −122.76 |
| 1852.6 | −122.76 |
| 1852.8 | −122.76 |
| 1853 | −122.76 |
| 1853.2 | −122.76 |
| 1853.4 | −118.02 |
| 1853.6 | −122.76 |
| 1853.8 | −122.76 |
| 1854 | −122.64 |
| 1854.2 | −122.76 |
| 1854.4 | −122.64 |
| 1854.6 | −116.556 |
| 1854.8 | −119.421 |
| 1855 | −118.74 |
| 1855.2 | −119.669 |
| 1855.4 | −122.64 |
| 1855.6 | −122.76 |
| 1855.8 | −122.76 |
| 1856 | −122.76 |
| 1856.2 | −122.64 |
| 1856.4 | −122.76 |
| 1856.6 | −122.76 |
| 1856.8 | −122.76 |
| 1857 | −122.76 |
| 1857.2 | −122.64 |
| 1857.4 | −122.64 |
| 1857.6 | −122.72 |
| 1857.8 | −122.64 |
| 1858 | −122.76 |
| 1858.2 | −122.76 |
| 1858.4 | −122.76 |
| 1858.6 | −122.76 |
| 1858.8 | −122.76 |
| 1859 | −122.64 |
| 1859.2 | −122.76 |
| 1859.4 | −107.844 |

APPENDIX D
Sample 5 and 10 MHz Processed Data

| BAC03D | 1 | 15:33:10 |
|---|---|---|
| 1851 | 2 | −119.143 |
| 1855 | 6 | −108.921 |
| 1860 | 4 | −107.273 |
| 1865 | 6 | −108.435 |
| 1870 | 4 | −122.48 |
| 1875 | 6 | −95.7653 |
| 1880 | 4 | −96.0451 |
| 1885 | 6 | −71.7152 |
| 1890 | 4 | −113.776 |
| 1895 | 6 | −101.738 |
| 1900 | 4 | −78.7091 |
| 1905 | 6 | −105.234 |
| 1910 | 4 | −115.618 |
| 1915 | 6 | −43.65 |
| 1920 | 4 | −115.63 |
| 1925 | 6 | −114.211 |
| 1930 | 4 | −117.815 |
| 1935 | 6 | −109.573 |
| 1940 | 4 | −112.483 |
| 1945 | 6 | −90.524 |
| 1950 | 4 | −103.766 |
| 1955 | 6 | −86.7225 |
| 1960 | 4 | −93.7974 |
| 1965 | 6 | −71.8663 |
| 1970 | 4 | −112.535 |
| 1975 | 6 | −99.6943 |
| 1980 | 4 | −86.1668 |
| 1985 | 6 | −105.068 |
| 1990 | 1.975 | −101.747 |

APPENDIX E

PCS Frequency pairs from the 1850-1990 MHz band utilizing 200 kHz RF channels

| # | Lic | SU Tx Freq MHz | # | Lic | BS Tx Freq MHz |
|---|---|---|---|---|---|
| 1 | A | 1850.1 | 1 | A | 1930.1 |
| 2 | A | 1850.3 | 2 | A | 1930.3 |
| 3 | A | 1850.5 | 3 | A | 1930.5 |
| 4 | A | 1850.7 | 4 | A | 1930.7 |
| 5 | A | 1850.9 | 5 | A | 1930.9 |
| 6 | A | 1851.1 | 6 | A | 1931.1 |
| 7 | A | 1851.3 | 7 | A | 1931.3 |
| 8 | A | 1851.5 | 8 | A | 1931.5 |
| 9 | A | 1851.7 | 9 | A | 1931.7 |
| 10 | A | 1851.9 | 10 | A | 1931.9 |
| 11 | A | 1852.1 | 11 | A | 1932.1 |
| 12 | A | 1852.3 | 12 | A | 1932.3 |
| 13 | A | 1852.5 | 13 | A | 1932.5 |
| 14 | A | 1852.7 | 14 | A | 1932.7 |
| 15 | A | 1852.9 | 15 | A | 1932.9 |
| 16 | A | 1853.1 | 16 | A | 1933.1 |
| 17 | A | 1853.3 | 17 | A | 1933.3 |
| 18 | A | 1853.5 | 18 | A | 1933.5 |
| 19 | A | 1853.7 | 19 | A | 1933.7 |
| 20 | A | 1853.9 | 20 | A | 1933.9 |
| 21 | A | 1854.1 | 21 | A | 1934.1 |
| 22 | A | 1854.3 | 22 | A | 1934.3 |
| 23 | A | 1854.5 | 23 | A | 1934.5 |
| 24 | A | 1854.7 | 24 | A | 1934.7 |
| 25 | A | 1854.9 | 25 | A | 1934.9 |
| 26 | A | 1855.1 | 26 | A | 1935.1 |
| 27 | A | 1855.3 | 27 | A | 1935.3 |
| 28 | A | 1855.5 | 28 | A | 1935.5 |
| 29 | A | 1855.7 | 29 | A | 1935.7 |
| 30 | A | 1855.9 | 30 | A | 1935.9 |
| 31 | A | 1856.1 | 31 | A | 1936.1 |
| 32 | A | 1856.3 | 32 | A | 1936.3 |
| 33 | A | 1856.5 | 33 | A | 1936.5 |
| 34 | A | 1856.7 | 34 | A | 1936.7 |
| 35 | A | 1856.9 | 35 | A | 1936.9 |
| 36 | A | 1857.1 | 36 | A | 1937.1 |
| 37 | A | 1857.3 | 37 | A | 1937.3 |
| 38 | A | 1857.5 | 38 | A | 1937.5 |
| 39 | A | 1857.7 | 39 | A | 1937.7 |
| 40 | A | 1857.9 | 40 | A | 1937.9 |
| 41 | A | 1858.1 | 41 | A | 1938.1 |
| 42 | A | 1858.3 | 42 | A | 1938.3 |
| 43 | A | 1858.5 | 43 | A | 1938.5 |
| 44 | A | 1858.7 | 44 | A | 1938.7 |
| 45 | A | 1858.9 | 45 | A | 1938.9 |
| 46 | A | 1859.1 | 46 | A | 1939.1 |
| 47 | A | 1859.3 | 47 | A | 1939.3 |
| 48 | A | 1859.5 | 48 | A | 1939.5 |
| 49 | A | 1859.7 | 49 | A | 1939.7 |
| 50 | A | 1859.9 | 50 | A | 1939.9 |
| 51 | A | 1860.1 | 51 | A | 1940.1 |

APPENDIX E-continued

PCS Frequency pairs from the 1850–1990 MHz band utilizing 200 kHz RF channels

| # | Lic | SU Tx Freq MHz | # | Lic | BS Tx Freq MHz |
|---|-----|----------------|---|-----|----------------|
| 52 | A | 1860.3 | 52 | A | 1940.3 |
| 53 | A | 1860.5 | 53 | A | 1940.5 |
| 54 | A | 1860.7 | 54 | A | 1940.7 |
| 55 | A | 1860.9 | 55 | A | 1940.9 |
| 56 | A | 1861.1 | 56 | A | 1941.1 |
| 57 | A | 1861.3 | 57 | A | 1941.3 |
| 58 | A | 1861.5 | 58 | A | 1941.5 |
| 59 | A | 1861.7 | 59 | A | 1941.7 |
| 60 | A | 1861.9 | 60 | A | 1941.9 |
| 61 | A | 1862.1 | 61 | A | 1942.1 |
| 62 | A | 1862.3 | 62 | A | 1942.3 |
| 63 | A | 1862.5 | 63 | A | 1942.5 |
| 64 | A | 1862.7 | 64 | A | 1942.7 |
| 65 | A | 1862.9 | 65 | A | 1942.9 |
| 66 | A | 1863.1 | 66 | A | 1943.1 |
| 67 | A | 1863.3 | 67 | A | 1943.3 |
| 68 | A | 1863.5 | 68 | A | 1943.5 |
| 69 | A | 1863.7 | 69 | A | 1943.7 |
| 70 | A | 1863.9 | 70 | A | 1943.9 |
| 71 | A | 1864.1 | 71 | A | 1944.1 |
| 72 | A | 1864.3 | 72 | A | 1944.3 |
| 73 | A | 1864.5 | 73 | A | 1944.5 |
| 74 | A | 1864.7 | 74 | A | 1944.7 |
| 75 | A | 1864.9 | 75 | A | 1944.9 |
| 76 | A | 1865.1 | 76 | A | 1945.1 |
| 77 | A | 1865.3 | 77 | A | 1945.3 |
| 78 | A | 1865.5 | 78 | A | 1945.5 |
| 79 | A | 1865.7 | 79 | A | 1945.7 |
| 80 | A | 1865.9 | 80 | A | 1945.9 |
| 81 | A | 1866.1 | 81 | A | 1946.1 |
| 82 | A | 1866.3 | 82 | A | 1946.3 |
| 83 | A | 1866.5 | 83 | A | 1946.5 |
| 84 | A | 1866.7 | 84 | A | 1946.7 |
| 85 | A | 1866.9 | 85 | A | 1946.9 |
| 86 | A | 1867.1 | 86 | A | 1947.1 |
| 87 | A | 1867.3 | 87 | A | 1947.3 |
| 88 | A | 1867.5 | 88 | A | 1947.5 |
| 89 | A | 1867.7 | 89 | A | 1947.7 |
| 90 | A | 1867.9 | 90 | A | 1947.9 |
| 91 | A | 1868.1 | 91 | A | 1948.1 |
| 92 | A | 1868.3 | 92 | A | 1948.3 |
| 93 | A | 1868.5 | 93 | A | 1948.5 |
| 94 | A | 1868.7 | 94 | A | 1948.7 |
| 95 | A | 1868.9 | 95 | A | 1948.9 |
| 96 | A | 1869.1 | 96 | A | 1949.1 |
| 97 | A | 1869.3 | 97 | A | 1949.3 |
| 98 | A | 1869.5 | 98 | A | 1949.5 |
| 99 | A | 1869.7 | 99 | A | 1949.7 |
| 100 | A | 1869.9 | 100 | A | 1949.9 |
| 101 | A | 1870.1 | 101 | A | 1950.1 |
| 102 | A | 1870.3 | 102 | A | 1950.3 |
| 103 | A | 1870.5 | 103 | A | 1950.5 |
| 104 | A | 1870.7 | 104 | A | 1950.7 |
| 105 | A | 1870.9 | 105 | A | 1950.9 |
| 106 | A | 1871.1 | 106 | A | 1951.1 |
| 107 | A | 1871.3 | 107 | A | 1951.3 |
| 108 | A | 1871.5 | 108 | A | 1951.5 |
| 109 | A | 1871.7 | 109 | A | 1951.7 |
| 110 | A | 1871.9 | 110 | A | 1951.9 |
| 111 | A | 1872.1 | 111 | A | 1952.1 |
| 112 | A | 1872.3 | 112 | A | 1952.3 |
| 113 | A | 1872.5 | 113 | A | 1952.5 |
| 114 | A | 1872.7 | 114 | A | 1952.7 |
| 115 | A | 1872.9 | 115 | A | 1952.9 |
| 116 | A | 1873.1 | 116 | A | 1953.1 |
| 117 | A | 1873.3 | 117 | A | 1953.3 |
| 118 | A | 1873.5 | 118 | A | 1953.5 |
| 119 | A | 1873.7 | 119 | A | 1953.7 |
| 120 | A | 1873.9 | 120 | A | 1953.9 |
| 121 | A | 1874.1 | 121 | A | 1954.1 |
| 122 | A | 1874.3 | 122 | A | 1954.3 |
| 123 | A | 1874.5 | 123 | A | 1954.5 |
| 124 | A | 1874.7 | 124 | A | 1954.7 |
| 125 | A | 1874.9 | 125 | A | 1954.9 |
| 1 | B | 1875.1 | 1 | B | 1955.1 |
| 2 | B | 1875.3 | 2 | B | 1955.3 |
| 3 | B | 1875.5 | 3 | B | 1955.5 |
| 4 | B | 1875.7 | 4 | B | 1955.7 |
| 5 | B | 1875.9 | 5 | B | 1955.9 |
| 6 | B | 1876.1 | 6 | B | 1956.1 |
| 7 | B | 1876.3 | 7 | B | 1956.3 |
| 8 | B | 1876.5 | 8 | B | 1956.5 |
| 9 | B | 1876.7 | 9 | B | 1956.7 |
| 10 | B | 1876.9 | 10 | B | 1956.9 |
| 11 | B | 1877.1 | 11 | B | 1957.1 |
| 12 | B | 1877.3 | 12 | B | 1957.3 |
| 13 | B | 1877.5 | 13 | B | 1957.5 |
| 14 | B | 1877.7 | 14 | B | 1957.7 |
| 15 | B | 1877.9 | 15 | B | 1957.9 |
| 16 | B | 1878.1 | 16 | B | 1958.1 |
| 17 | B | 1878.3 | 17 | B | 1958.3 |
| 18 | B | 1878.5 | 18 | B | 1958.5 |
| 19 | B | 1878.7 | 19 | B | 1958.7 |
| 20 | B | 1878.9 | 20 | B | 1958.9 |
| 21 | B | 1879.1 | 21 | B | 1959.1 |
| 22 | B | 1879.3 | 22 | B | 1959.3 |
| 23 | B | 1879.5 | 23 | B | 1959.5 |
| 24 | B | 1879.7 | 24 | B | 1959.7 |
| 25 | B | 1879.9 | 25 | B | 1959.9 |
| 26 | B | 1880.1 | 26 | B | 1960.1 |
| 27 | B | 1880.3 | 27 | B | 1960.3 |
| 28 | B | 1880.5 | 28 | B | 1960.5 |
| 29 | B | 1980.7 | 29 | B | 1960.7 |
| 30 | B | 1960.9 | 30 | B | 1960.9 |
| 31 | B | 1881.1 | 31 | B | 1961.1 |
| 32 | B | 1881.3 | 32 | B | 1961.3 |
| 33 | B | 1881.5 | 33 | B | 1961.5 |
| 34 | B | 1881.7 | 34 | B | 1961.7 |
| 35 | B | 1881.9 | 35 | B | 1961.9 |
| 36 | B | 1882.1 | 36 | B | 1962.1 |
| 37 | B | 1882.3 | 37 | B | 1962.3 |
| 38 | B | 1882.5 | 38 | B | 1962.5 |
| 39 | B | 1882.7 | 39 | B | 1962.7 |
| 40 | B | 1882.9 | 40 | B | 1962.9 |
| 41 | B | 1883.1 | 41 | B | 1963.1 |
| 42 | B | 1883.3 | 42 | B | 1963.3 |
| 43 | B | 1883.5 | 43 | B | 1963.5 |
| 44 | B | 1883.7 | 44 | B | 1963.7 |
| 45 | B | 1883.9 | 45 | B | 1963.9 |
| 46 | B | 1884.1 | 46 | B | 1964.1 |
| 47 | B | 1884.3 | 47 | B | 1964.3 |
| 48 | B | 1884.5 | 48 | B | 1964.5 |
| 49 | B | 1884.7 | 49 | B | 1964.7 |
| 50 | B | 1884.9 | 50 | B | 1964.9 |
| 51 | B | 1885.1 | 51 | B | 1965.1 |
| 52 | B | 1885.3 | 52 | B | 1965.3 |
| 53 | B | 1885.5 | 53 | B | 1965.5 |
| 54 | B | 1885.7 | 54 | B | 1965.7 |
| 55 | B | 1885.9 | 55 | B | 1965.9 |
| 56 | B | 1886.1 | 56 | B | 1966.1 |
| 57 | B | 1886.3 | 57 | B | 1966.3 |
| 58 | B | 1886.5 | 58 | B | 1966.5 |
| 59 | B | 1886.7 | 59 | B | 1966.7 |
| 60 | B | 1886.1 | 60 | B | 1966.9 |
| 61 | B | 1887.1 | 61 | B | 1967.1 |
| 62 | B | 1887.3 | 62 | B | 1967.3 |
| 63 | B | 1887.5 | 63 | B | 1967.5 |
| 64 | B | 1887.7 | 64 | B | 1967.7 |
| 65 | B | 1887.9 | 65 | B | 1967.9 |
| 66 | B | 1888.1 | 66 | B | 1968.1 |
| 67 | B | 1888.3 | 67 | B | 1968.3 |
| 68 | B | 1888.5 | 68 | B | 1968.5 |
| 69 | B | 1888.7 | 69 | B | 1968.7 |
| 70 | B | 1888.9 | 70 | B | 1968.9 |

APPENDIX E-continued

PCS Frequency pairs from the 1850–1990 MHz band utilizing 200 kHz RF channels

| # | Lic | SU Tx Freq MHz | # | Lic | BS Tx Freq MHz |
|---|-----|----------------|---|-----|----------------|
| 71 | B | 1889.1 | 71 | B | 1969.1 |
| 72 | B | 1889.3 | 72 | B | 1969.3 |
| 73 | B | 1889.5 | 73 | B | 1969.5 |
| 74 | B | 1889.7 | 74 | B | 1969.7 |
| 75 | B | 1889.9 | 75 | B | 1969.9 |
| 76 | B | 1890.1 | 76 | B | 1970.1 |
| 77 | B | 1890.3 | 77 | B | 1970.3 |
| 78 | B | 1890.5 | 78 | B | 1970.5 |
| 79 | B | 1890.7 | 79 | B | 1970.7 |
| 80 | B | 1890.9 | 80 | B | 1970.9 |
| 81 | B | 1891.1 | 81 | B | 1971.1 |
| 82 | B | 1891.3 | 82 | B | 1971.3 |
| 83 | B | 1891.5 | 83 | B | 1971.5 |
| 84 | B | 1891.7 | 84 | B | 1971.7 |
| 85 | B | 1891.9 | 85 | B | 1971.9 |
| 86 | B | 1892.1 | 86 | B | 1972.1 |
| 87 | B | 1892.3 | 87 | B | 1972.3 |
| 88 | B | 1892.5 | 88 | B | 1972.5 |
| 89 | B | 1892.7 | 89 | B | 1972.7 |
| 90 | B | 1892.9 | 90 | B | 1972.9 |
| 91 | B | 1893.1 | 91 | B | 1973.1 |
| 92 | B | 1893.3 | 92 | B | 1973.3 |
| 93 | B | 1893.5 | 93 | B | 1973.5 |
| 94 | B | 1893.7 | 94 | B | 1973.7 |
| 95 | B | 1893.9 | 95 | B | 1973.9 |
| 96 | B | 1894.1 | 96 | B | 1974.1 |
| 97 | B | 1894.3 | 97 | B | 1974.3 |
| 98 | B | 1894.5 | 98 | B | 1974.5 |
| 99 | B | 1894.7 | 99 | B | 1974.7 |
| 100 | B | 1894.9 | 100 | B | 1974.9 |
| 101 | B | 1895.1 | 101 | B | 1975.1 |
| 102 | B | 1895.3 | 102 | B | 1975.3 |
| 103 | B | 1895.5 | 103 | B | 1975.5 |
| 104 | B | 1895.7 | 104 | B | 1975.7 |
| 105 | B | 1895.9 | 105 | B | 1975.9 |
| 106 | B | 1896.1 | 106 | B | 1976.1 |
| 107 | B | 1896.3 | 107 | B | 1976.3 |
| 108 | B | 1896.5 | 108 | B | 1976.5 |
| 109 | B | 1896.7 | 109 | B | 1976.7 |
| 110 | B | 1896.9 | 110 | B | 1976.9 |
| 111 | B | 1897.1 | 111 | B | 1977.1 |
| 112 | B | 1897.3 | 112 | B | 1977.3 |
| 113 | B | 1897.5 | 113 | B | 1977.5 |
| 114 | B | 1897.7 | 114 | B | 1977.7 |
| 115 | B | 1897.9 | 115 | B | 1977.9 |
| 116 | B | 1898.1 | 116 | B | 1978.1 |
| 117 | B | 1898.3 | 117 | B | 1978.3 |
| 118 | B | 1898.5 | 118 | B | 1978.5 |
| 119 | B | 1898.7 | 119 | B | 1978.7 |
| 120 | B | 1898.9 | 120 | B | 1978.9 |
| 121 | B | 1899.1 | 121 | B | 1979.1 |
| 122 | B | 1899.3 | 122 | B | 1979.3 |
| 123 | B | 1899.5 | 123 | B | 1979.5 |
| 124 | B | 1899.7 | 124 | B | 1979.7 |
| 125 | B | 1899.9 | 125 | B | 1979.9 |

APPENDIX F

PCS Frequency pairs from the 1850–1990 MHz band utilizing 1.25 MHz RF channels
1.25 MHz RF channel bandwidth
80 MHz Transmit - Receive separation

| # | Lic | SU Tx | # | Lic | BS Tx |
|---|-----|-------|---|-----|-------|
| 1 | A | 1850.625 | 1 | A | 1930.625 |
| 2 | A | 1851.875 | 2 | A | 1931.875 |
| 3 | A | 1853.125 | 3 | A | 1933.125 |
| 4 | A | 1854.375 | 4 | A | 1934.375 |
| 5 | A | 1855.625 | 5 | A | 1935.625 |
| 6 | A | 1856.875 | 6 | A | 1936.875 |
| 7 | A | 1858.125 | 7 | A | 1938.125 |
| 8 | A | 1859.375 | 8 | A | 1939.375 |
| 9 | A | 1860.625 | 9 | A | 1940.625 |
| 10 | A | 1861.875 | 10 | A | 1941.875 |
| 11 | A | 1863.125 | 11 | A | 1943.125 |
| 12 | A | 1864.375 | 12 | A | 1944.375 |
| 13 | A | 1865.625 | 13 | A | 1945.625 |
| 14 | A | 1866.875 | 14 | A | 1946.875 |
| 15 | A | 1868.125 | 15 | A | 1948.125 |
| 16 | A | 1869.375 | 16 | A | 1949.375 |
| 17 | A | 1870.625 | 17 | A | 1950.625 |
| 18 | A | 1871.875 | 18 | A | 1951.875 |
| 19 | A | 1873.125 | 19 | A | 1953.125 |
| 20 | A | 1874.375 | 20 | A | 1954.375 |
| 1 | B | 1875.625 | 1 | B | 1955.625 |
| 2 | B | 1876.875 | 2 | B | 1956.875 |
| 3 | B | 1878.125 | 3 | B | 1958.125 |
| 4 | B | 1879.375 | 4 | B | 1959.375 |
| 5 | B | 1880.625 | 5 | B | 1960.625 |
| 6 | B | 1881.875 | 6 | B | 1961.875 |
| 7 | B | 1883.125 | 7 | B | 1963.125 |
| 8 | B | 1884.375 | 8 | B | 1964.375 |
| 9 | B | 1885.625 | 9 | B | 1965.625 |
| 10 | B | 1886.875 | 10 | B | 1966.875 |
| 11 | B | 1888.125 | 11 | B | 1968.125 |
| 12 | B | 1889.375 | 12 | B | 1969.375 |
| 13 | B | 1890.625 | 13 | B | 1970.625 |
| 14 | B | 1891.875 | 14 | B | 1971.875 |
| 15 | B | 1893.125 | 15 | B | 1973.125 |
| 16 | B | 1894.375 | 16 | B | 1974.375 |
| 17 | B | 1895.625 | 17 | B | 1975.625 |
| 18 | B | 1896.875 | 18 | B | 1976.875 |
| 19 | B | 1898.125 | 19 | B | 1978.125 |
| 20 | B | 1899.375 | 20 | B | 1979.375 |

APPENDIX G
Private Operational Fixed Microwave Service (POFS) Channels

Section 94.65 of FCC Rules

| | | Summary List Frequency | |
|---|---|---|---|
| | | # | MHz |

10 MHz paired channels

| | | | |
|---|---|---|---|
| 1855 | 1935 | 1 | 1855 |
| | | 2 | 1860 |
| 1865 | 1945 | 3 | 1865 |
| | | 4 | 1870 |
| 1875 | 1955 | 5 | 1875 |
| | | 6 | 1880 |
| 1885 | 1965 | 7 | 1885 |
| | | 8 | 1890 |
| 1895 | 1975 | 9 | 1895 |
| | | 10 | 1900 |
| 1905 | 1985 | 11 | 1905 |
| | | 12 | 1915 |

10 MHz unpaired channels

| | | |
|---|---|---|
| | 13 | 1925 |
| 1915 | | — |
| | 14 | 1935 |
| 1925 | 15 | 1940 |
| | 16 | 1945 |
| | 17 | 1950 |
| 5 MHz paired channels | 18 | 1955 |
| | 19 | 1960 |

APPENDIX G
Private Operational Fixed Microwave Service (POFS) Channels

Section 94.65 of FCC Rules

| | | Summary List Frequency | |
|---|---|---|---|
| | | # | MHz |
| 1860 | 1940 | 20 | 1965 |
| | | 21 | 1970 |
| 1870 | 1950 | 22 | 1975 |
| | | 23 | 1980 |
| 1880 | 1960 | 24 | 1985 |
| 1890 | 1970 | | |
| 1900 | 1980 | | |

APPENDIX H
PCS Database Supporting the CUC

Record Number: 1
Licensee: Licensee A
Contact: Barclay Jones
Address: 1025 Connecticut Ave., NW Suite 904
    Washinton, DC 20036
Phone: 202-296-0005
Site: Smith Office Building
    1230 15th Street, NW
    Washington, DC
Latitude: 38 54 16
Longitude: 77 02 07
Ground Elevation (ft AMSL): 65
Sector: 1
Transmit Antenna: Antenna Company SS65
Gain (dBi): 6.5 dB
Orientation (degrees True): omnidirectional
Antenna Radiation Center (ft AGL): 120
Transmitter Power Output (dBm): 37.5
Transmission Line Loss (dB): 4
Channel Group: 2B
Channel Numbers: 5, 14, 23, 32, 41, 50, 59
Receive Antenna 1: duplexed with transmit antenna
Receive Antenna 2: Antenna Company SS65
Gain (dBi): 6.5 dB
Orientation (degrees True): omnidirectional
Antenna Radiation Center (ft AGL): 120
Transmission Line Loss (dB): 4
Selected Receive Threshold (dBm): −96
Expected Undesired POFS Signal Strengths (dBm)
    WXX818:
    WXX819:
    WXX818:
    WXX810:
    WYYY927:
    WYYY926:
CUV Measured POFS Signal Strengths (dBm):
    WXX818:
    WXX819:
    WXX818:
    WXX810:
    WYYY927:
    WYYY926:
For each Smith Office Building grid point
    Row:
    Column:
    Latitude:
    Longitude:
    Critical:
    Expected Desired Signal Strength (dBm):
    Expected Undesired PCS Signal Strengths (dBm):
        Chester Building:
            Sector 1:
            Sector 2:
            Sector 3:
        Jeff Davis:
    Expected Undesired POFS Signal Strengths (dBm):
        WXX818:
        WXX819:
        WXX818:
        WXX810:
        WYYY927:
        WYYY926:
    TMU CUV Measured PCS Signal Strengths (dBm):
        Chester Building:
            Sector 1:
            Sector 2:
            Sector 3:
        Jeff Davis:
    TMU CUV Measured POFS Signal Strengths (dBm):
        WXX818:
        WXX819:
        WXX818:
        WXX810:
        WYYY927:
        WYYY926:
Record Number: 2
Licensee: Licensee A
Contact: Barclay Jones
Address: 1025 Connecticut Ave., NW Suite 904
    Washinton, DC 20036
Phone: 202-296-0005
Site: Chester Building
    3205 Wisconsin Ave, NW
    Washington, DC
Latitude: 38 56 01
Longitude: 77 04 21
Ground Elevation (ft AMSL): 375
Sector: 1
Transmit Antenna: Accurate Antenna 342
Gain (dBi): 7 dB
Orientation (degrees True): 45
Antenna Radiation Center (ft AGL): 120
Transmitter Power Output (dBm): 35.5
Transmission Line Loss (dB): 2.5
Channel Group: 1A
Channel Numbers: 1, 10, 19, 28, 37, 46
Receive Antenna 1: duplexed with transmit antenna
Receive Antenna 2: Accurate Antenna 342
Gain (dBi): 7 dB
Orientation (degrees True): 165
Antenna Radiation Center (ft AGL): 120
Transmission Line Loss (dB): 2.5
Selected Receive Threshold (dBm): −96
Expected Undesired POFS Signal Strengths (dBm):
    WXX818:
    WXX819:
    WXX818:
    WXX810:
    WYYY927:
    WYYY926:
CUV Measured POFS Signal Strengths (dBm):
    WXX818:
    WXX819:
    WXX818:
    WXX810:
    WYYY927:
    WYYY926:
Sector: 2
Transmit Antenna: Accurate Antenna 342
Gain (dBi): 7 dB
Orientation (degrees True): 165
Antenna Radiation Center (ft AGL): 120
Transmitter Power Output (dBm): 35.5
Transmission Line Loss (dB): 2.5
Channel Group: 1B
Channel Numbers: 4, 13, 22, 31, 40, 49, 58, 67, 76, 85, 94
Receive Antenna 1: duplexed with transmit antenna
Receive Antenna 2: Accurate Antenna 342
Gain (dBi): 7 dB
Orientation (degrees True): 165
Antenna Radiation Center (ft AGL): 120
Transmission Line Loss (dB): 2.5
Selected Receive Threshold (dBm): −96
Expected Undesired POFS Signal Strengths (dBm):
    WXX818:

APPENDIX H
PCS Database Supporting the CUC

WXX819:
WXX818:
WXX810:
WYYY927:
WYYY926:
CUV Measured POFS Signal Strengths (dBm):
  WXX818:
  WXX819:
  WXX818:
  WXX810:
  WYYY927:
  WYYY926:
Sector: 3
Transmit Antenna: Accurate Antenna 342
Gain (dBi): 7 dB
Orientation (degrees True): 285
Antenna Radiation Center (ft AGL): 120
Transmitter Power Output (dBm): 35.5
Transmission Line Loss (dB): 2.5
Channel Group: 1C
Channel Numbers: 7, 16, 25, 34
Receive Antenna 1: duplexed with transmit antenna
Receive Antenna 2: Accurate Antenna 342
Gain (dBi): 7 dB
Orientation (degrees True): 285
Antenna Radiation Center (ft AGL): 120
Transmission Line Loss (dB): 2.5
Selected Receive Threshold (dBm): −96
Expected Undesired POFS Signal Strengths (dBm):
  WXX818:
  WXX819:
  WXX818:
  WXX810:
  WYYY927:
  WYYY926:
CUV Measured POFS Signal Strengths (dBm)
  WXX818:
  WXX819:
  WXX818:
  WXX810:
  WYYY927:
  WYYY926:
For each Chester Building grid point
  Row:
  Column:
  Latitude:
  Longitude:
  Critical:
  Expected Desired Signal Strength (dBm):
    Sector 1:
    Sector 2:
    Sector 3:
  Expected Undesired PCS Signal Strengths (dBm):
    Smith Office Building:
    Jeff Davis:
  Expected Undesired POFS Signal Strengths (dBm):
    WXX818:
    WXX819:
    WXX818:
    WXX810:
    WYYY927:
    WYYY926:
  TMU CUV Measured PCS Signal Strengths (dBm):
    Smith Office Building:
    Jeff Davis:
  TMU CUV Measured POFS Signal Strengths (dBm):
    WXX818:
    WXX819:
    WXX818:
    WXX810:
    WYYY927:
    WYYY926:

APPENDIX I
POFS Database Supporting the CUC

Record Number: 1
Call Sign: WXX818
Licensee: CITY POWER COMPANY
Contact: Fred Johnson
Address: 234 EAST MAIN STREET
    FAIRFAX, VA 22041
Phone: 703-824-5555
Site: SKYLINE TOWER
    5203 LEESBURG PIKE
    FALLS CHURCH, VA
Latitude: 38 50 42
Longitude: 77 7 22
Ground Elevation (ft AMSL): 256
Transmit Frequency (MHz): 1855
Receive Frequency (MHz): 1935
Call Sign of Receive Station: WXX819
Transmitter/Receiver: GTE LENKURT
Model: 79F1-01
Modulation: Analog
Transmitter Power Output (dBm): 25
Antenna: ANDREW CORPORATION
Model: GP10F-18
Gain (dBi): 33.1
Orientation (degrees True): 207.965
Antenna Radiation Center (ft AGL): 273
Transmission Line Loss (db): 6
Path Distance (miles): 7.808
Expected PCS Base Station Signal Strengths (dBm):
    Chester Building:
    Smith Office Building
    Jeff Davis: −89.1
Record Number: 2
Call Sign: WXX819
Licensee: CITY POWER COMPANY
Contact: Fred Johnson
Address: 234 EAST MAIN SThBEF
    FAIRFAX, VA 22041
    Phone: 703-824-5555
Site: SPRINGFIELD OFFICE PARK
    1023 SPRING LANE
    SPRINGFIELD, VA
Latitude: 38 44 42
Longitude: 77 11 26
Ground Elevation (ft AMSL): 177
Transmit Frequency (MHz): 1935
Receive Frequency (MHz): 1855
Call Sign of Receive Station: WXX818
Transmitter: GTE LENKURT
Model: 79F1-01
Modulation: Analog
Transmitter Power Output (dBm): 25
Antenna: ANDREW CORPORATION
Model: GP10F-18
Gain (dBi): 33.1
Orientation (degrees True): 27.922
Antenna Radiation Center (ft AGL): 164
Transmission Line Loss (db): 2
Path Distance (miles): 7.808
Expected PCS Worst Case Grid Point Signal Strengths (dBm):
    Chester Building
    Smith Office Building
    Jeff Davis: −102.6
        Grid Point Row: 3
        Grid Point Column: 4
Record Number: 3
Call Sign: WXX818
Licensee: CITY POWER COMPANY
Contact: Fred Johnson
Address: 234 EAST MAIN STREET
    FAIRFAX, VA 22041
Phone: 703-824-5555
Site: SKYLINE TOWER
    5203 LEESBURG PIKE
    FALLS CHURCH, VA
Latitude: 38 50 42
Longitude: 77 7 22
Ground Elevation (ft AMSL): 256

APPENDIX I
POFS Database Supporting the CUC

Transmit Frequency (MHz): 1905
Receive Frequency (MHz): 1985
Call Sign of Receive Station: WXX810
Transmitter: GTE LENKURT
Model: 79F1-01
Modulation: Analog
Transmitter Power Output (dBm): 16
Antenna: ANDREW CORPORATION
Model: GP8F-18
Gain (dBi): 31.2
Orientation (degrees True): 93.704
Antenna Radiation Center (ft AGL): 273
Transmission Line Loss (db): 11
Path Distance (miles): 2.658
Expected PCS Base Station Signal Strengths (dBm)
    Receive Frequency not in Licensee A authorized bands.
Record Number: 4
Call Sign: WXX810
Licensee: CITY POWER COMPANY
Contact: Fred Johnson
Address: 234 EAST MAIN STREET
    FAIRFAX, VA 22041
Phone: 703-824-5555
Site: CITY POWER BUILDING
    4513 GLEBE ROAD
    ALEXANDRIA, VA
Latitude: 38 50 33
Longitude: 77 4 25
Ground Elevation (ft AMSL): 40
Transmit Frequency (MHz): 1985
Receive Frequency (MHz): 1905
Call Sign of Receive Station: WXX818
Transmitter: GTE LENKURT
Model: 79F1-01
Modulation: Analog
Transmitter Power Output (dBm): 16
Antenna: ANDREW CORPORATION
Model: GP8F-18
Gain (dBi): 31.2
Orientation (degrees True): 273.735
Antenna Radiation Center (ft AGL): 44
Effective Radiated Power (dBm): 16.0
Transmission Line Loss (db): 2
Path Distance (miles): 2.658
Expected PCS Base Station Signal Strengths (dBm):
    Receive Frequency not in Licensee A authorized bands.
Record Number: 5
Call Sign: WYYY927
Licensee: PUBLISHING COMPANY, INC.
Contact: Larry Wise
Address: 5566 STATE AVENUE, NW
    WASHINGTON, DC 20036
Phone: 202-296-7777
Site: PCI WAREHOUSE
    2240 BROADBIRCH DRIVE
    SILVER SPRING, MD
Latitude: 39 3 26
Longitude: 76 57 49
Ground Elevation (ft AMSL): 363
Transmit Frequency (MHz): 1960
Receive Frequency (MHz): 1880
Call Sign of Receive Station: WYYY926
Transmitter: FARINON ELECTRIC CO
Model: FE-7920-01
Modulation: Digital
Transmitter Power Output (dBm): 30
Antenna: ANDREW CORPORATION
Model: GP8F-18A
Gain (dBi): 31.2
Orientation (degrees True): 206.914
Antenna Radiation Center (ft AGL): 146
Effective Radiated Power (dBm): 30.0
Transmission Line Loss (db): 1
Path Distance (miles): 12.621
Expected PCS Worst Case Grid Point Signal Strengths (dBm):
    Chester Building
    Smith Office Building

APPENDIX I
POFS Database Supporting the CUC

Jeff Davis:
Record Number: 6
Call Sign: WYYY926
Licensee: PUBLISHING COMPANY, INC.
Contact: Larry Wise
Address: 5566 STATE AVENUE, NW
    WASHINGTON, DC 20036
Phone: 202-296-7777
Site: PCI OFFICE BUILDING
    1000 WILSON BOULEVARD
    ARLINGTON, VA
Latitude: 38 53 39
Longitude: 77 4 11
Ground Elevation (ft AMSL): 67
Transmit Frequency (MHz): 1880
Receive Frequency (MHz): 1960
Call Sign of Receive Station: WYYY927
Transmitter: FARINON ELECTRIC CO
Model: FE-7920-01
Modulation: Digital
Transmitter Power Output (dBm): 30
Antenna: ANDREW CORPORATION
Model: GP8F-18A
Gain (dBi): 31.2
Orientation (degrees True): 26.847
Antenna Radiation Center (ft AGL): 319
Effective Radiated Power (dBm): 30.0
Transmission Line Loss (db): 5
Path Distance (miles): 12.621
Expected PCS Base Station Signal Strengths (dBm):
    Chester Building:
    Smith Office Building:
    Jeff Davis:

APPENDIX J
PCS Database Entry for the "Jeff Davis" Site

Record Number: 3
Licensee: Licensee A
Contact: Barclay Jones
Address: 1025 Connecticut Ave., NW Suite 904
    Washinton, DC 20036
Phone: 202-296-0005
Site: Jeff Davis
    1150 Jefferson Highway
    Arlington, VA
Latitude: 38 51 49
Longitude: 77 03 03
Ground Elevation (ft AMSL): 65
Sector: 1
Transmit Antenna: Antenna Company SS65
Gain (dBi): 6.5 dB
Orientation (degrees True): omnidirectional
Antenna Radiation Center (ft AGL): 130
Transmitter Power Output (dBm): 37.5
Transmission Line Loss (dB): 4
Channel Group: 1A
Channel Numbers: 55, 44, 73, 82, 91, 100, 109, 118
Channel Group: 1B
Channel Numbers: 103, 112, 121
Channel Group: 1C
Channel Numbers: 61, 70, 79, 88, 97, 106, 115, 124
Receive Antenna 1: duplexed with transmit antenna
Receive Antenna 2: Antenna Company SS65
Gain (dBi): 6.5 dB
Orientation (degrees True): omnidirectional
Antenna Radiation Center (ft AGL): 130
Transmission Line Loss (dB): 4
Selected Receive Threshold (dBm): −96
Expected Undesired POFS Signal Strengths (dBm):
    WXX818:
    WXX819:
    WXX818: −110.2
    WXX810:

APPENDIX J
PCS Database Entry for the "Jeff Davis" Site

WYYY927:
WYYY926:
CUV Measured POFS Signal Strengths (dBM):
    WXX818:
    WXX819:
    WXX818:
    WXX810:
    WYYY927:
    WYYY926:
An example of one Jeff Davis grid point:
    Row: 5
    CoLumn: 6
    Latitude: 38 52 34
    Longitude: 77 03 43
    Critical: Yes
    Expected Desired Signal Strength (dBm): −89.4
    Expected Undesired PCS Signal Strengths (dBm):
        Smith Office Building:
        Chester Building:
            Sector 1:
            Sector 2: −94.3
            Sector 3:
    Expected Undesired POFS Signal Strengths (dBm):
        WXX818:
        WXX819: −104.3
        WXX818:
        WXX810:
        WYYY927:
        WYYY926:
    TMU CUV Measured PCS Signal Strengths (dBm):
        Smith Office Building:
        Chester Building:
            Sector 1:
            Sector 2:
            Sector 3:
    TMU CUV Measured POFS Signal Strengths (dBm):
        WXX818:
        WXX819: −98.1
        WXX818:
        WXX810:
        WYYY927:
        WYYY926:

APPENDIX K
Calculations Utilized in the Determination of Total Interfering Power at WXX 818

| | dBm | mW |
|---|---|---|
| Allowed Power at WXX818 = | −79.8 | 1.0E−08 |
| Calculated Power at WXX818 from Jeff Davis Operation in bands | | |
| 1930–1940 | −89.1 | 1.2E−09 |
| 1940–1942 | −95.1 | 3.1E−10 |
| 1942–1945 | −104.1 | 3.9E−11 |

| Number of Jeff Davis Channels in bands | | | Total Interfering Power at WXX818 | |
|---|---|---|---|---|
| 1930–1940 | 1940–1942 | 1942–1945 | dBm | mW |
| 0 | 0 | 0 | −86.2 | 2.4E−09 |
| 1 | 0 | 0 | −84.4 | 3.6E−09 |
| 2 | 0 | 0 | −83.1 | 4.9E−09 |
| 3 | 0 | 0 | −82.2 | 6.1E−09 |
| 4 | 0 | 0 | −81.4 | 7.3E−09 |
| 5 | 0 | 0 | −80.7 | 8.6E−09 |
| 6 | 0 | 0 | −80.1 | 9.8E−09 |
| 7 | 0 | 0 | −79.6 | 1.1E−08 |
| 6 | 1 | 0 | −80.0 | 1.0E−08 |
| 6 | 2 | 0 | −79.8 | 1.0E−08 |
| 6 | 1 | 1 | −79.9 | 1.0E−08 |
| 6 | 1 | 2 | −79.9 | 1.0E−08 |
| 6 | 1 | 3 | −79.9 | 1.0E−08 |
| 6 | 1 | 4 | −79.9 | 1.0E−08 |
| 6 | 1 | 5 | −79.9 | 1.0E−08 |
| 6 | 1 | 6 | −79.9 | 1.0E−08 |
| 6 | 1 | 7 | −79.8 | 1.0E−08 |
| 6 | 1 | 8 | −79.8 | 1.0E−08 |
| 6 | 1 | 9 | −79.8 | 1.0E−08 |
| 6 | 1 | 10 | −79.8 | 1.0E−08 |
| 6 | 1 | 11 | −79.8 | 1.1E−08 |
| 6 | 1 | 12 | −79.8 | 1.1E−08 |
| 6 | 1 | 13 | −79.7 | 1.1E−08 |

APPENDIX L
Assignment of Specific Channels to Channel Groups
200 KHz RF channel bandwidth
80 MHz Transmit - Receive separation

| Group 1A | | | Group 2A | | | Group 3A | | |
|---|---|---|---|---|---|---|---|---|
| # | SU Tx | BS Tx | # | SU Tx | BS Tx | # | SU Tx | BS Tx |
| 1 | 1850.1 | 1930.1 | 2 | 1850.3 | 1930.3 | 3 | 1850.5 | 1930.5 |
| 10 | 1851.9 | 1931.9 | 11 | 1852.1 | 1932.1 | 12 | 1852.3 | 1932.3 |
| 19 | 1853.7 | 1933.7 | 20 | 1853.9 | 1933.9 | 21 | 1854.1 | 1934.1 |
| 28 | 1855.5 | 1935.5 | 29 | 1855.7 | 1935.7 | 30 | 1855.9 | 1935.9 |
| 37 | 1857.3 | 1937.3 | 38 | 1857.5 | 1937.5 | 39 | 1857.7 | 1937.7 |
| 46 | 1859.1 | 1939.1 | 47 | 1859.3 | 1939.3 | 48 | 1859.5 | 1939.5 |
| 55 | 1860.9 | 1940.9 | 56 | 1861.1 | 1941.1 | 57 | 1861.3 | 1941.3 |
| 64 | 1862.7 | 1942.7 | 65 | 1862.9 | 1942.9 | 66 | 1863.1 | 1943.1 |
| 73 | 1864.5 | 1944.5 | 74 | 1864.7 | 1944.7 | 75 | 1864.9 | 1944.9 |
| 82 | 1866.3 | 1946.3 | 83 | 1866.5 | 1946.5 | 84 | 1866.7 | 1946.7 |
| 91 | 1868.1 | 1948.1 | 92 | 1868.3 | 1948.3 | 93 | 1868.5 | 1948.5 |

APPENDIX L-continued

Assignment of Specific Channels to Channel Groups
200 KHz RF channel bandwidth
80 MHz Transmit - Receive separation

| 100 | 1869.9 | 1949.9 | 101 | 1870.1 | 1950.1 | 102 | 1870.3 | 1950.3 |
|---|---|---|---|---|---|---|---|---|
| 109 | 1871.7 | 1951.7 | 110 | 1871.9 | 1951.9 | 111 | 1872.1 | 1952.1 |
| 118 | 1873.5 | 1953.5 | 119 | 1873.7 | 1953.7 | 120 | 1873.9 | 1953.9 |

| Group 1B | | | Group 2B | | | Group 3B | | |
|---|---|---|---|---|---|---|---|---|
| # | SU Tx | BS Tx | # | SU Tx | BS Tx | # | SU Tx | BS Tx |
| 4 | 1850.7 | 1930.7 | 5 | 1850.9 | 1930.9 | 6 | 1851.1 | 1931.1 |
| 13 | 1852.5 | 1932.5 | 14 | 1852.7 | 1932.7 | 15 | 1852.9 | 1932.9 |
| 22 | 1854.3 | 1934.3 | 23 | 1854.5 | 1934.5 | 24 | 1854.7 | 1934.7 |
| 31 | 1856.1 | 1936.1 | 32 | 1856.3 | 1936.3 | 33 | 1856.5 | 1936.5 |
| 40 | 1857.9 | 1937.9 | 41 | 1858.1 | 1938.1 | 42 | 1858.3 | 1938.3 |
| 49 | 1859.7 | 1939.7 | 50 | 1859.9 | 1939.9 | 51 | 1860.1 | 1940.1 |
| 58 | 1861.5 | 1941.5 | 59 | 1861.7 | 1941.7 | 60 | 1861.9 | 1941.9 |
| 67 | 1863.3 | 1943.3 | 68 | 1863.5 | 1943.5 | 69 | 1863.7 | 1943.7 |
| 76 | 1865.1 | 1945.1 | 77 | 1865.3 | 1945.3 | 78 | 1865.5 | 1945.5 |
| 85 | 1866.9 | 1946.9 | 86 | 1867.1 | 1947.1 | 87 | 1867.3 | 1947.3 |
| 94 | 1868.7 | 1948.7 | 95 | 1868.9 | 1948.9 | 96 | 1869.1 | 1949.1 |
| 103 | 1870.5 | 1950.5 | 104 | 1870.7 | 1950.7 | 105 | 1870.9 | 1950.9 |
| 112 | 1872.3 | 1952.3 | 113 | 1872.5 | 1952.5 | 114 | 1872.7 | 1952.7 |
| 121 | 1874.1 | 1954.1 | 122 | 1874.3 | 1954.3 | 123 | 1874.5 | 1954.5 |

| Group 1C | | | Group 2C | | | Group 3C | | |
|---|---|---|---|---|---|---|---|---|
| # | SU Tx | BS Tx | # | SU Tx | BS Tx | # | SU Tx | BS Tx |
| 7 | 1851.3 | 1931.3 | 8 | 1851.5 | 1931.5 | 9 | 1851.7 | 1931.7 |
| 16 | 1853.1 | 1933.1 | 17 | 1853.3 | 1933.3 | 18 | 1853.5 | 1933.5 |
| 25 | 1854.9 | 1934.9 | 26 | 1855.1 | 1935.1 | 27 | 1855.3 | 1935.3 |
| 34 | 1856.7 | 1936.7 | 35 | 1856.9 | 1936.9 | 36 | 1857.1 | 1937.1 |
| 43 | 1858.5 | 1938.5 | 44 | 1858.7 | 1938.7 | 45 | 1858.9 | 1938.9 |
| 52 | 1660.3 | 1940.3 | 53 | 1860.5 | 1940.5 | 54 | 1860.7 | 1940.7 |
| 61 | 1862.1 | 1942.1 | 62 | 1862.3 | 1942.3 | 63 | 1862.5 | 1942.5 |
| 70 | 1863.9 | 1943.9 | 71 | 1864.1 | 1944.1 | 72 | 1864.3 | 1944.3 |
| 79 | 1865.7 | 1945.7 | 80 | 1865.9 | 1945.9 | 81 | 1866.1 | 1946.1 |
| 88 | 1867.5 | 1947.5 | 89 | 1867.7 | 1947.7 | 90 | 1867.9 | 1947.9 |
| 97 | 1869.3 | 1949.3 | 98 | 1869.5 | 1949.5 | 99 | 1869.7 | 1949.7 |
| 106 | 1871.1 | 1951.1 | 107 | 1871.3 | 1951.3 | 108 | 1871.5 | 1951.5 |
| 115 | 1872.9 | 1952.9 | 116 | 1873.1 | 1953.1 | 117 | 1873.3 | 1953.3 |
| 124 | 1874.7 | 1954.7 | 125 | 1874.9 | 1954.9 | | | |

I claim:

1. An autonomous remote measurement unit in a communications system having a central controller, for autonomously measuring signal strengths in a communications environment with other communications transmissions, the remote measurement unit comprising:

a means for accepting instructions from the central controller, wherein the remote measurement unit is under the control and direction of the central controller;

a means, connected to the accepting means, for autonomously controlling the operation of the remote measurement unit, the control exercised based upon the instructions received from the central controller, wherein the instructions include desired frequency band for measurement and schedule of measurement, at least one of the instructions reformatted by the controlling means as commands to control measurement;

an antenna, operably connected to the controlling means, for receiving communications transmissions;

a means for measuring, connected to the receiving means and the controlling means, the signal strengths of any communications transmissions across the frequency band and according to the schedule of measurement contained in the commands from the controlling means;

a means for storing the signal strengths of the communications transmissions in data files; and means, connected to the storing means, for uploading the data files containing the signal strengths to the central controller, wherein the signal strengths are used by the central controller to verify theoretical radio frequency analyses with measurements of actual frequency usage the result of which is an available channel list of permissible frequencies for transmission.

2. The remote measurement unit as described in claim 1, wherein the remote measurement unit is integrated into a base station.

3. An autonomous remote measurement unit in a personal communications system having a plurality of base stations, subscriber units and an autonomous central controller, for measuring signal strengths at a fixed site location in a communications environment with other communications transmissions, the remote measurement unit comprising:

a means for controlling the operation of the remote measurement unit, the control exercised based upon instructions received from the central controller, wherein the instructions include desired frequency band for measurement and schedule of measurement, at least one of the instructions reformatted by the controlling means as commands to control measurement;

a means, operably connected to the controlling means, for receiving communications transmissions from the base stations, the subscriber units and other communications transmissions;

a means, connected to the controlling means and the receiving means, for measuring the signal strengths of communications transmissions from base stations, subscriber units and other communications systems across the frequency band and according to the schedule of measurement contained in the commands from the controlling means;

means for storing the measured signal strengths of the communications transmissions in data files; and means, connected to the storing means, for transmitting the data files containing the stored signal strengths of the communications transmissions to the central controller for verifying theoretical interference performance predictions with the measured signal strengths.

4. An autonomous control system in a personal communications system having a plurality of base stations, subscriber units and a central controller, for autonomously measuring signal strengths in a communications environment with other communications transmissions from other communications networks the remote measurement system comprising:

at least one autonomous remote measurement unit located at a fixed site location, comprising:

a means for accepting instructions from the central controller, wherein the remote measurement unit is under the control and direction of the central controller;

a means, connected to the accepting means, for autonomously controlling the operation of the remote measurement unit, the control exercised based upon the instructions received from the central controller, wherein the instructions include desired frequency band of measurement and schedule of measurement, at least one of the instructions reformatted as commands to control measurement;

a means, operably connected to the controlling means, for receiving communications transmissions from the base stations, the subscriber units and other communications transmissions;

a spectrum analyzer, connected to the controlling and the receiving means, for measuring the signal strengths of communications transmissions from the base stations, subscriber units and other communications systems across the frequency band and according to the schedule of measurement as indicated in the commands from the remote measurement unit controlling means; and means for storing the measured signal strengths of communications transmissions in data files; and the central controller, in communications with the remote measurement unit, comprising:

means for receiving the stored signal strengths of the communications transmissions;

means for discriminating between the signals from the base stations and the subscriber units and the signals from the other communications networks using the stored signal strengths; and means, connected to the receiving means and discriminating means, for verifying theoretical interference performance predictions with the discriminated signal strengths whereby the personnel communications system adapts to a changing RF environment and shares frequencies allocated to the other communications system within the same region through the provision of centralized control.

5. An autonomous mobile remote measurement unit in a personal communications system having a plurality of base stations, subscriber units and a central controller, for measuring signal strengths in a communications environment with other communications transmissions, the mobile communications unit comprising:

input means for capturing position information at various grid point locations located around the base station location;

a means, connected to the input means, for controlling the operation of the mobile remote measurement unit;

a means for receiving communications transmissions from base stations, subscriber units and other communications transmissions;

a means for measuring, connected to the receiving means, the signal strengths of communications transmissions from base stations, subscriber units and other communications systems at different locations upon the command of the controller means; and means for storing the signal strengths of communications transmissions so that the stored signal strengths of the communications transmissions can be used later by a central controller to verify theoretical interference performance predictions with the measured signal strengths whereby the personnel communications system shares frequencies allocated to the other communications system within the same region through the provision of centralized control.

6. A mobile remote measurement unit for measuring signal strengths of communications transmissions in a personal communications system with a central controller for controlling the mobile remote measurement system, base stations and subscriber units, in an environment with other communications networks, the mobile remote measuring unit comprising:

a central computing device for controlling the operation of the mobile remote measurement unit, the control based upon instructions received from the central controller, wherein the instructions include desired measurement frequency band and measurement schedule;

a positioning device, connected to the central computing device, for acquiring position data;

an antenna, connected to the central computing device, for receiving communications transmissions;

a radio frequency spectrum analyzer, electronically connected to the antenna and the central computing device, for measuring signal strengths of the communications transmissions, wherein the signal strengths are measured over a specified frequency range and time period as dictated by the central computing device;

means for storing the measured signal strengths of communications transmissions in data files;

means for discriminating between signals from the base stations and subscriber units and the signals from the other communications networks using the stored signal strengths;

means, connected to the discriminating means, for verifying theoretical interference performance predictions with the discriminated signal strengths whereby the personnel communications system adapts to a changing RF environment and shares frequencies allocated to the other communications system within the same region through the provision of centralized control.

7. The mobile remote measurement unit of claim 6 wherein the signal strengths are measured by the spectrum analyzer when the unit is in motion.

8. A mobile remote measurement unit for measuring signal strengths of communications transmissions in a personal communications system with a central controller for controlling the mobile remote measurement system, base stations and subscriber units, in an environment with other communications networks, the mobile remote measuring unit comprising:

a central computing device for controlling the operation of the mobile remote measurement unit, the control based upon instructions received from the central controller, wherein at least one of the instructions include desired measurement frequency band and measurement schedule;

a positioning device, connected to the central computing device, for acquiring position data;

an antenna, connected to the central computing device, for receiving communications transmissions;

a radio frequency spectrum analyzer, electronically connected to the antenna and the central computing device, for measuring signal strengths of the communications transmissions, wherein the signal strengths are measured over a specified frequency range and time period as dictated by the central computing device;

means for storing the measured signal strengths of communications transmissions in data files;

means, connected to the storing means, for uploading the data files containing the signal strengths to the central controller, wherein the signal strengths are used by the central controller to verify theoretical radio frequency analyses with measurements of actual frequency usage, the result of which is an available channel list of permissible frequencies for transmission.

9. The mobile remote measurement unit of claim 8 wherein the signal strengths are measured by the spectrum analyzer when the unit is in motion.

10. A method for autonomously controlling a personal communications system having a plurality of base stations, subscriber units, a central controller, and at least one remote measurement unit, in a communications environment with other communications transmissions from other communications networks, the method comprising the following steps:

commanding the remote measurement unit to measure signal strengths across a predetermined frequency band, wherein commands, sent from the central controller to the remote measurement unit, include a frequency band table and measurement schedule;

performing a noise self-calibration test;

measuring signal strengths across the frequency band at the remote measurement unit, as indicated in the frequency band table and according to the measurement schedule;

packaging the measured signal strengths into data records, wherein the data records include power measurements;

uploading the measured signal strength data records from the remote measurement unit to the central controller;

discriminating between the personal communications system base station and subscriber unit signals from the other communications transmission from other communications networks, the discrimination performed by comparing the measured signal strengths with theoretical signal strength values.

* * * * *